(12) United States Patent
Muniswamy-Reddy et al.

(10) Patent No.: US 11,237,751 B2
(45) Date of Patent: Feb. 1, 2022

(54) FAILOVER FOR FAILED SECONDARY IN CROSS-ZONE REPLICATED BLOCK STORAGE DEVICES

(71) Applicant: Amazon Technologies, Inc., Seattle, WA (US)

(72) Inventors: Kiran-Kumar Muniswamy-Reddy, Sammamish, WA (US); Danny Wei, Seattle, WA (US); Norbert Paul Kusters, Seattle, WA (US); Romain Benoit Seguy, Seattle, WA (US); Rahul Upadhyaya, Seattle, WA (US); Divya Ashok Kumar Jain, Issaquah, WA (US); William Zaharchuk, Seattle, WA (US); Wells Lin, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/579,687

(22) Filed: Sep. 23, 2019

(65) Prior Publication Data
US 2021/0089212 A1    Mar. 25, 2021

(51) Int. Cl.
*G06F 3/06* (2006.01)
*G06F 11/20* (2006.01)
*G06F 11/07* (2006.01)

(52) U.S. Cl.
CPC ............. *G06F 3/065* (2013.01); *G06F 3/064* (2013.01); *G06F 3/067* (2013.01); *G06F 3/0619* (2013.01);
(Continued)

(58) Field of Classification Search
CPC ...... G06F 3/065; G06F 3/0664; G06F 3/0622; G06F 3/0619; G06F 11/203; G06F 3/064; G06F 3/067; G06F 11/0793; G06F 3/617
(Continued)

(56) References Cited

U.S. PATENT DOCUMENTS

| 11,010,089 B2 | 5/2021 | Benoit et al. |
| 2017/0293540 A1 | 10/2017 | Mehta et al. |

(Continued)

FOREIGN PATENT DOCUMENTS

WO    WO 2021/061528 A1    4/2021

OTHER PUBLICATIONS

U.S. Appl. No. 16/579,626, Cross-Zone Replicated Block Storage Devices, filed Sep. 23, 2019.
(Continued)

*Primary Examiner* — David Yi
*Assistant Examiner* — Zubair Ahmed
(74) *Attorney, Agent, or Firm* — Knobbe, Martens, Olson & Bear, LLP

(57) ABSTRACT

The present disclosure generally relates to creating virtualized block storage devices whose data is replicated across isolated computing systems to lower risk of data loss even in wide-scale events, such as natural disasters. The virtualized device can include at least two volumes, each of which is implemented in a distinct computing system. In the case of a failed volume, a new volume can be created and populated with data from the surviving volume. During population, new writes can continue to be replicated to the new volume. The population process can write data from the surviving volume to the new volume "under" new writes, such that the population process does not overwrite data included in the new writes.

20 Claims, 15 Drawing Sheets

(52) U.S. Cl.
CPC .......... *G06F 3/0622* (2013.01); *G06F 3/0664* (2013.01); *G06F 11/0793* (2013.01); *G06F 11/203* (2013.01)

(58) Field of Classification Search
USPC ........................................................ 711/162
See application file for complete search history.

(56) References Cited

U.S. PATENT DOCUMENTS

| | | | |
|---|---|---|---|
| 2018/0181315 A1 | 6/2018 | Kusters et al. | |
| 2018/0181330 A1 | 6/2018 | Kusters et al. | |
| 2018/0181348 A1 | 6/2018 | Kusters et al. | |
| 2018/0183868 A1 | 6/2018 | Kusters et al. | |
| 2018/0232165 A1 | 8/2018 | Kusters et al. | |
| 2018/0232308 A1* | 8/2018 | Kusters | G06F 3/065 |
| 2019/0197173 A1 | 6/2019 | Tahara et al. | |
| 2019/0340136 A1* | 11/2019 | Irwin | G06F 3/0683 |
| 2020/0145480 A1 | 5/2020 | Sohail et al. | |
| 2021/0089211 A1 | 3/2021 | Kiran-Kumar | |
| 2021/0089238 A1 | 3/2021 | Kiran-Kumar | |
| 2021/0089662 A1 | 3/2021 | Kiran-Kumar | |

OTHER PUBLICATIONS

U.S. Appl. No. 16/579,614, Hierarchical Authority Store for Cross-Zone Replicated Block Storage Devices, filed Sep. 23, 2019.
U.S. Appl. No. 16/579,680, Encrypted Cross-Zone Replication for Cross-Zone Replicated Block Storage Devices, filed Sep. 23, 2019.
U.S. Appl. No. 16/579,620, Approximating Replication Lag in Cross-Zone Replicated Block Storage Devices, filed Sep. 23, 2019.
Gemignani, "Amazon RDS Under the Hood: Multi-AZ," Retrieved from the Internet, Oct. 14, 2019, URL: https://aws.amazon.com/blogs/database/amazon-rds-under-the-hood-multi-az/, 7 pages.
Wikipedia, "Distributed Replicated Block Device," Retrieved from the Internet, Oct. 14, 2019, URL: https://en.wikipedia.org/wiki/Distributed_Replicated_Block_Device, 4 pages.
International Search Report and Written Opinion in PCT/US2020/051575 dated Jan. 14, 2021 in 15 pages.

* cited by examiner

FAILOVER FOR FAILED SECONDARY IN CROSS-ZONE REPLICATED BLOCK STORAGE DEVICES

BACKGROUND

Cloud computing, in general, is an approach to providing access to information technology resources through services, such as Web services, where the hardware and/or software used to support those services is dynamically scalable to meet the needs of the services at any given time. In cloud computing, elasticity refers to network-delivered computing resources that can be scaled up and down by the cloud service provider to adapt to changing requirements of users. The elasticity of these resources can be in terms of processing power, storage, bandwidth, etc. Elastic computing resources may be delivered automatically and on-demand, dynamically adapting to the changes in resource requirement on or within a given user's system. For example, a user can use a cloud service to host a large online streaming service, set up with elastic resources so that the number of webservers streaming content to users scale up to meet bandwidth requirements during peak viewing hours, and then scale back down when system usage is lighter.

A user typically will rent, lease, or otherwise pay for access to resources through the cloud, and thus does not have to purchase and maintain the hardware and/or software to provide access to these resources. This provides a number of benefits, including allowing users to quickly reconfigure their available computing resources in response to the changing demands of their enterprise, and enabling the cloud service provider to automatically scale provided computing service resources based on usage, traffic, or other operational needs. This dynamic nature of network-based computing services, in contrast to a relatively static infrastructure of on-premises computing environments, requires a system architecture that can reliably re-allocate its hardware according to the changing needs of its user base.

DETAILED DESCRIPTION

Introduction

Figure 1:
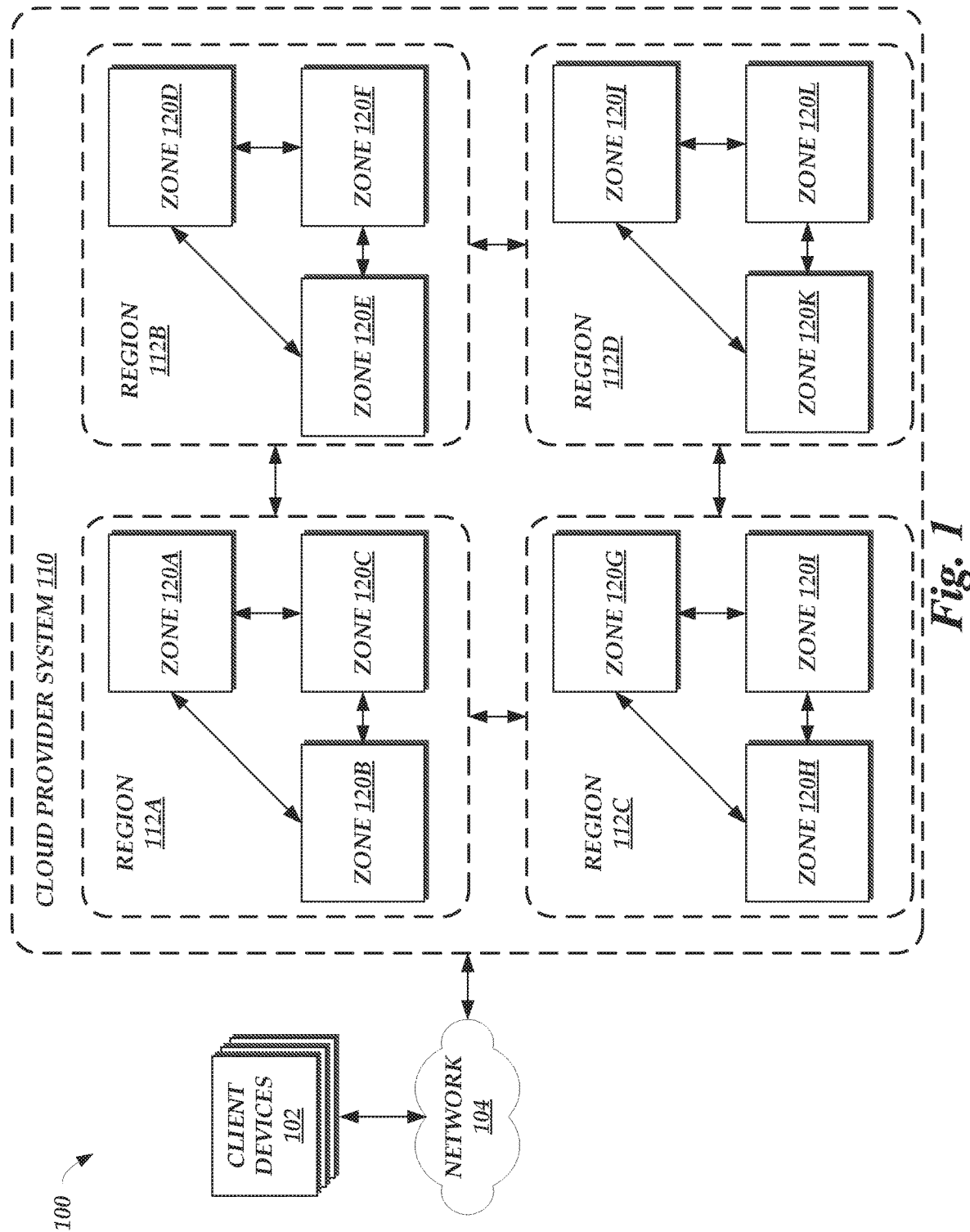
FIG. 1 depicts a schematic diagram of cloud provider system in which various embodiments according to the present disclosure can be implemented.

Generally described, aspects of the present disclosure relate to the creation and management of network-based block storage devices, such as devices provided a virtual hard disk drives to virtual machine instances by a cloud computing provider. More specifically, aspects of the present disclosure relate to providing network-based block storage devices that are replicated across multiple isolated computing systems, such that a failure of one computing system is unlikely to cause complete failure to the data of the block storage device.

One technique for increasing resiliency in network-based block storage devices is to replicate the device within a given computing system, such as within a given data center. This approach has the benefit of protecting against device-level failures, such as mechanical failures of an individual computer. This approach also has the benefit of simplicity—because the replicated devices are interconnected within the computing system (which typically has high levels of bandwidth), replication has little or no impact on the performance of the network-based block storage device. However, while these benefits are desirable, intra-system replication leaves block storage devices susceptible to wide-scale failures, such as power outages to a data center, natural or man-made disasters, or the like.

Thus, in addition to or independently of intra-system replication, it is often desirable to have an "off-site" backup of important information. Typically, these off-site backups take the form of "point-in-time" copies of a block storage device (e.g., a copy of the device as it exists each 24 hours), and are stored in a manner that is not immediately usable to a virtual machine instance. For example, off-site backups may be stored on tape drives, or stored as archive files within an object-based data storage service. For data that is critical to operation of a given system, off-site backups therefore create risk of both data loss (due to the backup occurring only periodically) and service interruption (due to the need to recreate a block storage device from the data stored within the tape drive, archive file, etc., which can take hours or even days depending on the amount of data and type of network used for data transfer).

The present disclosure addresses the above-noted problems by enabling a network-based block storage device to be replicated across isolated computing systems (referred to as "availability zones"), which systems may be isolated from one another to reduce a likelihood that wide scale failure of one system (e.g., a natural disaster) impacts operation of another system. The instantiations of the block storage device in each isolated computing system are generally referred to herein as a "volume." The disclosed replication may be done synchronously across availability zones, that is, a write may be replicated across availability zones after receipt of a request to perform the write to the volume but before acknowledging back to the requestor that the write has been performed. In contrast to off-site backup solutions, each volume may represent an independently functional instantiation of a block storage device, such that little or no change in the state of the volume is required to use the volume as a virtual hard disk for a virtual machine instance (e.g., such that no creation of a new block storage device from a tape drive or archive file is required). In some scenarios, the performance of each volume may be equivalent, such that a change in the volume used by a virtual machine instance as the block storage device incurs little or no performance cost. Moreover, in some embodiments, the different volumes representing the cross-system block storage device may be updated synchronously, such that the volumes remain up-to-date with respect to one another, and such that a change in the volume used by a virtual machine instance as the block storage device results in no data loss. Thus, the cross-system replicated block storage devices disclosed herein increase the resiliency of network-based storage devices to wide-scale events, such as natural disasters, while addressing detriments of traditional off-site backup techniques.

These and other aspects of the disclosure will now be described with regard to certain examples and embodiments, which are intended to illustrate but not limit the disclosure. Although the examples and embodiments described herein will focus, for the purpose of illustration, specific calculations and algorithms, one of skill in the art will appreciate the examples are illustrate only, and are not intended to be limiting.

Overview of Example Cloud Provider System

FIG. 1 depicts an example computing environment 100 in which a cloud provider system 110 provides cloud computing services to client devices 102 via a network. As used herein, a cloud provider system 110 (sometimes referred to simply as a "cloud") refers to a large pool of network-accessible computing resources (such as compute, storage, or networking resources, applications, or services), which may be virtualized or bare-metal. The cloud provider system 110 can provide convenient, on-demand network access to a shared pool of configurable computing resources that can be programmatically provisioned and released in response to customer commands. These resources can be dynamically provisioned and reconfigured to adjust to variable load. The concept of "cloud computing" can thus be considered as both the applications delivered as services over the network 104 and the hardware and software in the cloud provider system 110 that provide those services.

As shown in FIG. 1, the cloud provider system 110 is illustratively divided into a number of regions 112A-D. Each region 112 may be geographically isolated from other regions 112. For example, region 112A may be geographically located on the U.S. east coast, region 112B may be geographically located on the U.S. west coast, region 112C may be geographically located in Europe, region 112D may be geographically located in China, etc. While four regions 112 are shown in FIG. 1, a cloud provider system 110 may include any number of regions. Each region 112 is illustratively in communication via a network, which may be a private network of the system 110 (e.g., privately owned circuits, leased lines, etc.) or a public network (e.g., the Internet).

In FIG. 1, each region 112 is further shown as divided into a number of zones 120 (across all regions 112, zones 120A-L), which may also be referred to as availability zones or availability regions. Each zone 120 illustratively represents a computing system that is isolated from the systems of other zones 120 in a manner that reduces a likelihood that wide-scale events, such as natural or man-made disasters, impact operation of all (or any two) zones 120 in a region. For example, the computing resources of each zone 120 may be physically isolated by being spread throughout the region 112 at distances to selected to reduce a likelihood of a wide-scale event affecting performance of all (or any two) zones 120. Further, the computing resources of each zone 120 may be associated with independent electric power, and thus be electrically isolated from resources of other zones 120 (though the resources may still communicate with one another via a network, which may involve transmission of electrical signals for communication rather than power), independent cooling systems, independent intra-zone networking resources, etc. In some instances, zones 120 may be further isolated by limiting operation of computing resources between zones 120. For example, virtual machine instances in a zone 120 may be limited to using network-based block storage devices provided by an instantiation of a block storage service in that zone 120. Restricting inter-zone cloud computing operation may limit the "blast radius" of any failure within a single zone 120, decreasing the chances that such a failure inhibits operation of other zones 120. Illustratively, services provided by the cloud provider system 110 may generally be replicated within zones 120, such that a client device 102 can (if they so choose) utilize the cloud provider system 110 entirely (or almost entirely) by interaction with a single zone 120.

As shown in FIG. 1, each zone 120 is in communication with other zones 120 via a network. Preferably, communication links between zones 120 represent high speed, private networks. For example, zones 120 may be interconnected via private fiber optic lines. In one embodiment, the communication links between zones 120 are dedicated entirely or partially to inter-zone communication, and are separated from other communication links of the zone. For example, each zone 120 may have one or more fiber optic connections to each other zone, and one or more separate connections to other regions 112 and/or the network 104.

Each zone 120 within each region 112 is illustratively connected to the network 104. The network 104 can include any appropriate network, including an intranet, the Internet, a cellular network, a local area network or any other such network or combination thereof. In the illustrated embodiment, the network 104 is the Internet. Protocols and components for communicating via the Internet or any of the other aforementioned types of communication networks are known to those skilled in the art of computer communications and thus, need not be described in more detail herein. While the system 110 is shown in FIG. 1 as having a single connection to the network 104, multiple connections may exist in various implementations. For example, each zone 120 may have one or more connections to the network 104 distinct from other zones 120 (e.g., one or more links to an Internet exchange point interconnecting different autonomous systems on the Internet).

Client computing devices 102 can include any network-equipped computing device, for example desktop computers, laptops, smartphones, tablets, e-readers, gaming consoles, and the like. Users can access the cloud provider system 110 via the network 104 to view or manage their data and computing resources, as well as to use websites and/or applications hosted by the cloud provider system 110. For example, users may access resources within a zone 120 to establish a virtual computing device utilizing a network-based block storage device. In accordance with embodiments of the present disclosure, the network-based block storage device may be replicated across isolated computing systems, such as across two zones 120 within a region 112. For ease of reference, such replicated block storage devices may be referred to herein as "cross-zone block storage devices" (or simply "cross-zone storage devices"). While it may be preferential for cross-zone storage devices to be replicated across zones 120 within a given region 112 (e.g., to take advantage of a greater expected performance of communication between zones 120 in the region), embodiments of the present disclosure can also be utilized to provide cross-zone storage devices replicated across zones of two different regions 112 (which may be referred to as cross-region replication).

Overview of a Cloud Provider Zone

Figure 2:
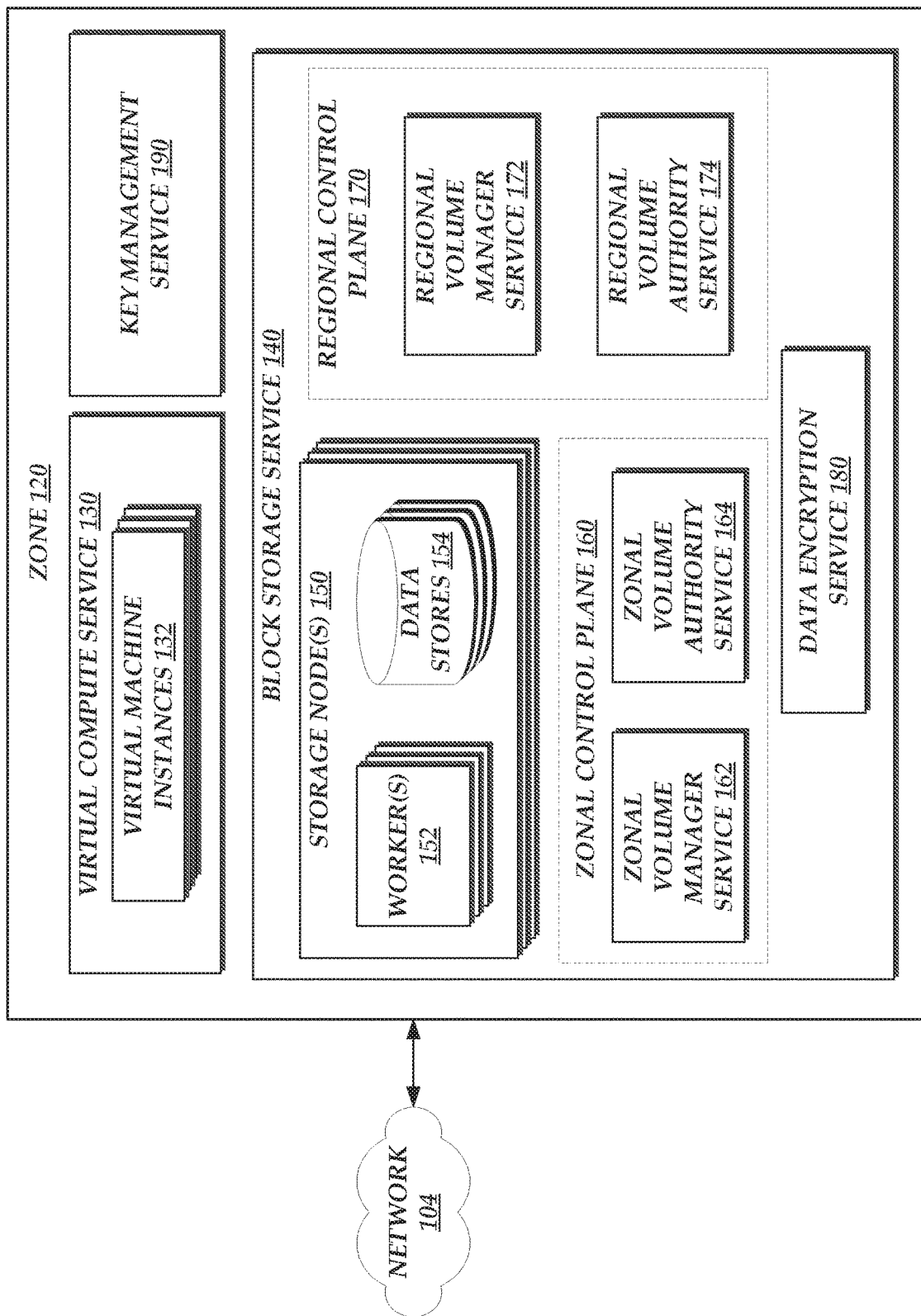
FIG. 2 depicts a schematic diagram of a zone of the cloud provider system of FIG. 1, including a block storage service configured to implement virtualized, cross-zone block storage devices in accordance with aspects of the present disclosure.

FIG. 2 depicts an example configuration of a zone 120. As noted above, a zone 120 may represent an independent, isolated computing system providing a variety of services to client devices 102 independent of the computing systems of other zones 120. Thus, each zone may include a variety of computing, storage, and network resources that provide various services to client devices 102, as well as components to facilitate creation and management of such resources. One skilled in the art will therefore appreciate that the illustrative configuration of FIG. 2 is simplified for ease of description.

As shown in FIG. 2, the zone includes a virtual compute service 130. Generally described, the virtual compute service 130 enables client devices 102 to create, configure, and manage operation of virtual machine instances 132, each of which represents a configurable, virtualized computing device hosted on a substrate host computing device. Each virtual machine instance 132 may, for example, represent a virtual computing device provisioned with an operating system and various other software and configured according to specification of a client device 102 to provide a network-based service for or on behalf of a user of the client device 102. For example, virtual machine instances 132 may be configured to provide web servers, databases, transcoding services, machine learning services, or any of a variety of computational tasks. The virtual compute service 130 may provide a variety of types of virtual machine instances 132 representing, for example, processors of different central processing unit (CPU) architectures, different additional processors (e.g., graphically processing units, application specific integrated circuits (ASICS), etc.), different speeds or configurations of such processors, and the like. A variety of techniques for implementing a virtual compute service 130 to provide virtual machine instances 132 are known in the art, and thus operation of the virtual compute service 130 is not described in detail herein.

While the virtual compute service 130 is shown in FIG. 2 as including virtual machine instances 132, the virtual compute service 130 may in some instances additionally or alternatively provide "bare metal" servers. Generally described, a "bare metal" server refers to a single-tenant physical host device the zone 120, as opposed to host devices which may have multiple tenants (e.g., different customers) by virtualizing the server using a hypervisor to host multiple virtual machines for the multiple tenants. Bare metal servers might not run a hypervisor or be virtualized, but can still be delivered via a cloud provider network service model. In some scenarios, customers may use bare metal servers to run their own hypervisor, or may run workloads in a non-virtualized environment for direct access to the processor and memory resources of the underlying server.

Further, while the virtual compute service 130 is shown in FIG. 2 as including virtual machine instances 132, the virtual compute service 130 may in some instances additionally or alternatively provide customers with container-based compute resources. A container, as referred to herein, packages up code and all its dependencies so an application (also referred to as a task) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). Virtual machine technology can use one physical server to run the equivalent of many servers (each of which is called a virtual machine). While multiple virtual machines can run on one physical machine, each virtual machine typically has its own copy of an operating system, as well as the applications and their related files, libraries, and dependencies. Virtual machines are commonly referred to as compute instances or simply "instances." Some containers can be run on instances that are running a container agent, and some containers can be run on bare-metal servers.

Both instances and containers as described herein may "attach" to a volume in order to use the volume as if it were a local disk. For example, a software component referred to as a "client" may run in an instance or container. The client represents instructions that enable a compute instance or container to connect to, and perform I/O operations at, a remote data volume (e.g., a data volume stored on a physically separate computing device accessed over a network). The client may be implemented on an offload card of a server that includes the processing units (e.g., CPUs or GPUs) of the compute instance or container.

Because the virtual compute service 130 can be generally configured to provide computation resources (e.g., as opposed to data storage), the zone 120 further includes a block storage service 140. As used herein, "block storage" generally refers to data storage organized as blocks, which are typically fixed-size data sequences of a given number of bytes (e.g., 2n kilobytes for a specified value of n). Block storage can be contrasted, for example, with object storage systems, which enable access and manipulation of data at the level of an individual object (e.g., a file). Block storage is commonly used as principle storage of a computing device, including a virtual computing devices. For example, most hard disk drives represent block storage devices, and most operating systems (OSs) are intended for installation on block storage devices. As such, the block storage service 140 can provide network-based access to a virtualized block storage device (e.g., a virtual hard disk drive). For example, virtual machine instances 132 may connect via a network to the block storage service 140 in order to "attach" a virtualized hard drive of the service 140 and store an operating system of the instance 132. In this manner, the need of the virtual compute service 130 to provide data storage is reduced or eliminated, and resiliency of virtual machine instances 132 is increased. For example, migration of an instance 132 may require simply replicating a configuration of the instance 132 on the service 130 to a new host device to create a new instance 132, and attaching to the new instance 132 an existing virtual hard drive provided by the block storage service 140.

In the example of FIG. 2, virtualized block storage devices of the storage service 140 are provided by storage nodes 150. Each storage node 150 can represent one or more associated computing devices (e.g., co-located within a rack) configured to enable virtual machine instances 132 to write to and read from volumes representing virtualized block storage devices. In some instances, a virtualized block storage device may be represented by a single volume made accessible by a one or more storage nodes 150 of the service 140 within a single zone 120. However, in accordance with embodiments of the present disclosure, a virtualized block storage device may also be represented by as multiple volumes hosted by multiple storage nodes 150 within multiple zones 120.

The storage nodes 150 can store volumes of data in block format. In general, a volume can correspond to a logical collection of data, such as a set of data maintained on behalf of a user. The data of the volume may be replicated between multiple devices within a distributed computing system, in order to provide multiple replicas of the volume (where such replicas may collectively represent the volume on the computing system). Replicas of a volume in a distributed computing system can beneficially provide for automatic failover and recovery, for example by allowing the user to access either a primary replica of a volume or a secondary replica of the volume that is synchronized to the primary replica at a block level, such that a failure of either the primary or secondary replica does not inhibit access to the information of the volume. The role of the primary volume can be to facilitate reads and writes (sometimes referred to as "input output operations," or simply "I/O operations") at the volume, and to propagate any writes to the secondary (preferably synchronously in the I/O path, although asynchronous replication can also be used). The secondary replica can be updated synchronously with the primary replica and provide for seamless transition during failover operations, whereby the secondary replica assumes the role of the primary replica, and either the former primary is designated as the secondary or a new replacement secondary replica is provisioned. Although certain examples herein discuss a primary replica and a secondary replica, it will be appreciated that a logical volume can include multiple secondary replicas. According to the present disclosure, multiple volumes corresponding to the same (or substantially the same) set of data can be replicated across multiple availability zones.

In FIG. 2, each storage node 150 includes a number of workers 152 and a number of data stores 154. In this example configuration, a volume is associated with at least two workers 152: a primary worker 152 that accepts reads from and writes to the volume, and a secondary worker 152 to which writes to the volume are duplicated (in case the primary worker 152 fails). Writes are illustratively represented as log entries in a journal, with each log entry indicating, for example, bytes written to the volume and a location in the volume to which the bytes are written (e.g., an offset from a beginning byte location in the volume). The primary worker 152 is illustratively configured to synchronously replicate write logs to the secondary worker 152, such that replication to the secondary worker 152 must occur before a write is acknowledged to a source device (e.g., an instance 132). Each worker 152 may include a limited amount of storage in order to store a log journal, which storage is preferably configured to prioritize speed over size. For example, storage may be in the form of a solid state disk, flash memory, non-volatile random access memory (NVRAM), or the like. To reduce the size requirements of worker 152 storage, each storage node 150 further includes data stores 154, which may represent any of a variety of persistent data storage devices, such as magnetic disk drives, solid state disk drives, NVRAM, etc. A primary worker 152 for a volume is illustratively configured to periodically "flush" it's log journal to the data stores 154, and to record a location within the data stores at which the data was written (e.g., as metadata associating an offset of the volume, as known by the instance 132, with one or more offsets on a data store 154), which record is then also provided to the secondary worker 152. In one embodiment, data written to the data stores 154 is erasure coded to increase resiliency of the stored data. To service reads to a volume, a primary worker 152 may utilize its journal as a cache, responding to the read with data identified within the log journal (if such data has not yet been flushed) and otherwise retrieving the data from the data stores 154 at a location indicated by the records maintained at the worker 152. In this manner, writes to a volume are either replicated (e.g., at the primary and secondary worker 152) or resiliently stored (e.g., erasure coded within the data stores 154) such that failure of an individual device within a node 150 is unlikely to cause a loss of data within the volume.

One example implementation of storage nodes is provided within U.S. Patent Application Publication No. 2018/0181330 to Kusters et al., published Jun. 28, 2018 (the "'330 Publication"), the entirety of which is incorporated by reference herein (wherein the "head nodes" and "slides" of the '330 Publication may represent the workers 152 and data stores 154, respectively). While storage nodes 150 with bifurcated compute and storage devices are shown in FIG. 2, other configurations are possible. For example, simplified storage nodes containing only workers 152 with their own local storage may be used, which the primary worker 152 being responsible for writing data to its own local storage and also replicating data to a secondary worker 152 for similar local storage. However, the configuration described herein may beneficially increase storage efficiency (e.g., by utilizing erasure coding rather than requiring complete redundancy), while also increasing modularity by enabling independent scaling of workers 152 and data stores 154.

In some embodiments, data written to storage nodes may be encrypted. In one embodiment, encryption may occur at a host device of the virtual machine instance 132. Each volume of a data store may be associated with a unique encryption key, which may illustratively be stored at a key management service 190 (which service represents a secure storage location that maintains and distributes keys only to authorized and authenticated entities). For example, an instance 132 may provide a first key (e.g., a "customer" key) to the key management service 190 when creating a volume, and the key management service 190 may select for the volume a volume key. The key management service 190 can then encrypt the volume key using the customer key, and provide that encrypted volume key to the storage node 150 for storage as metadata related to the volume. When an instance 132 attempts to "attach" the volume as a hard disk, the node 150 may provide the encrypted key to a host device of the instance 132, which may in turn submit a request to the key management service 190 to decrypt the encrypted key. Assuming the host device is authenticated and authorized, the key management service 190 then provides the (unencrypted) volume key to the host device, such that the host device can encrypt all writes to the volume with the volume key.

In one embodiment, all volumes of a cross-zone block storage device are encrypted with the same volume key. Thus, no re-encryption of data is required when synchronizing data between volumes. However, re-use of a volume key between volumes may reduce the independence of such volumes (e.g., preventing the volumes from being divided into independent devices). Thus, in another embodiment, each volume of a cross-zone block storage device is encrypted with a different volume key. Due to this configuration, data written to one volume (e.g., the "primary" volume, designated to handle writes to the cross-zone block storage device) may not be simply mirrored to a second volume. Rather, the data would be required to be decrypted and re-encrypted with a volume key of the second volume. To facilitate this operation, the block storage service 140 includes a data encryption service 180, the operation of which is described in more detail below.

In addition to the above, the block storage service 140 includes elements that implement two control planes: a zonal control plane 160, and a regional control plane 170. Generally described, the term "control plane" refers to a broad subdivision of traffic and operations on the block storage service 140, and particularly to control signals through the service 140 to conduct administrative or "control" operations, such as system configuration and management (e.g., resource placement, hardware capacity management, diagnostic monitoring, system state information). The "control plane" can be contrasted with the "data plane," where the data plane generally includes non-administrative operations such as transferring client data to and from the customer resources (e.g., instances 132, volumes, etc.) and includes customer resources that are implemented on the cloud provider network 110 (e.g., computing instances, containers, block storage volumes, databases, file storage). The control plane components are typically implemented on a separate set of servers from the data plane servers, and control plane traffic and data plane traffic may be sent over separate/distinct networks. In the case of FIG. 2, the zonal control plane 160 generally refers to systems that manage operation of a volume within the zone 120. Specifically, the zonal control plane 160 can include a zonal volume manager service 162 that operates to receive requests to create a volume, to select a primary and secondary worker 152 for that volume, and to instruct and coordinate operation of the workers 152 and control plane 160 to finalize creation of the volume. The zonal volume manager service 162 may similarly handle requests to modify or delete volumes within the zone 120. In addition to the zonal volume manager service 162, the zonal control plane 160 includes a zonal volume authority service 164, which represents one or more devices configured to store information associating a volume to workers 152. For example, the zonal volume authority service 164 may store a designation of a first worker 152 as the "primary" worker 152 for a volume, and a designation of a second worker 152 as a secondary worker 152. Each worker 152 may illustratively be configured to verify its authority as primary with the authority service 164 prior to accepting writes to a volume.

While shown as individual elements in FIG. 2, the manager service 162 and authority service 164 may in practice be implemented by multiple devices operating in a distributed manner. For example, the authority service 164 may be implemented by an odd number of redundant devices utilizing a consensus protocol (e.g., a Paxos protocol, simple majority protocol, or other consensus protocol) to ensure consistent designation of a primary worker 152 for a volume. In some instances, functionalities of the elements of the zonal control plane 160 may be divided. For example, rather than a zonal volume manager service 162 selecting workers 152 to implement a volume, the plane 160 may include a dedicated placement service configured to select an appropriate worker 152 on which to place a volume.

In addition to the zonal control plane 160, the block storage service 140 further includes a regional control plane 170, which includes a regional volume manager service 172 and regional volume authority service 174. Whereas the elements of the zonal control plane 160 are generally tasked with configuring a volume inside the zone 120, elements of the regional control plane 170 are generally tasked with configuring a cross-zone block storage device among multiple zones 120 (e.g., as a distinct volume in each zone 120). As such, the regional volume manager service 172 is illustratively configured to accept requests (e.g., from instances 132, client devices 102, etc.) to create a cross-zone block storage device, and to coordinate within the regional control plane 170 and with zonal control planes 160 of each zone 120 to create such a cross-zone block storage device. Illustratively, the regional volume manager service 172 may select at least two zones in which to create volumes for the cross-zone device, and instruct zonal control planes 160 for each zone to create such a volume. The regional volume manager service 172 may further instruct the regional volume authority service 174 as to a relative hierarchy for the volumes representing the cross-zone device. Illustratively (and in a similar manner to how workers 152 may be designated as primary and secondary for a volume), the regional volume manager service 172 may designate a first volume in a first zone 120 as the primary volume for the cross-zone device, and a second volume in a second zone 120 as the secondary volume for the cross-zone device, etc. Such designation can be stored at the regional volume authority service 174. Additionally or alternatively to storing designations of particular volumes as a primary and secondary volumes, the regional volume authority service 174 may store information designating a particular zone 120 as a primary zone for a cross-zone device, and one or more other zones 120 as secondary zones. Illustratively, where a single volume of a cross-zone device is implemented in each zone 120, designation of a particular zone 120 can be utilized to identify a particular volume having authority to accept writes to the cross-zone device. Where multiple volumes are implemented in each zone 120, designation of a particular volume as a primary volume can be utilized to identify the particular volume having authority to accept writes to the cross-zone device.

Similarly to the elements of the zonal control plane 160, the elements of the regional control plane 170 can be implemented in a distributed manner. However, while the distributed devices for the zonal control plane 160 are generally within the zone, the devices making up the regional control plane 170 are preferably distributed across multiple zones 120 within a region 112. Thus, the elements of the regional control plane 170 shown in FIG. 2 may represent, for example, one third of the elements of the regional control plane 170 (where 3 zones are included within a region 112). Similarly to as described above, the elements of the regional control plane 170 are illustratively implemented by an odd number of redundant devices utilizing a consensus protocol (e.g., a Paxos protocol or other consensus protocol) to ensure consistent decisions and operations. Beneficially, by dividing the regional control plane 170 among zones 120, a wide-scale event that renders one zone 120 inoperable would not be expected to prevent consensus from being reached within remaining zones 120.

Example Interactions for Writes to Cross-Zone Storage Devices

Figure 3:
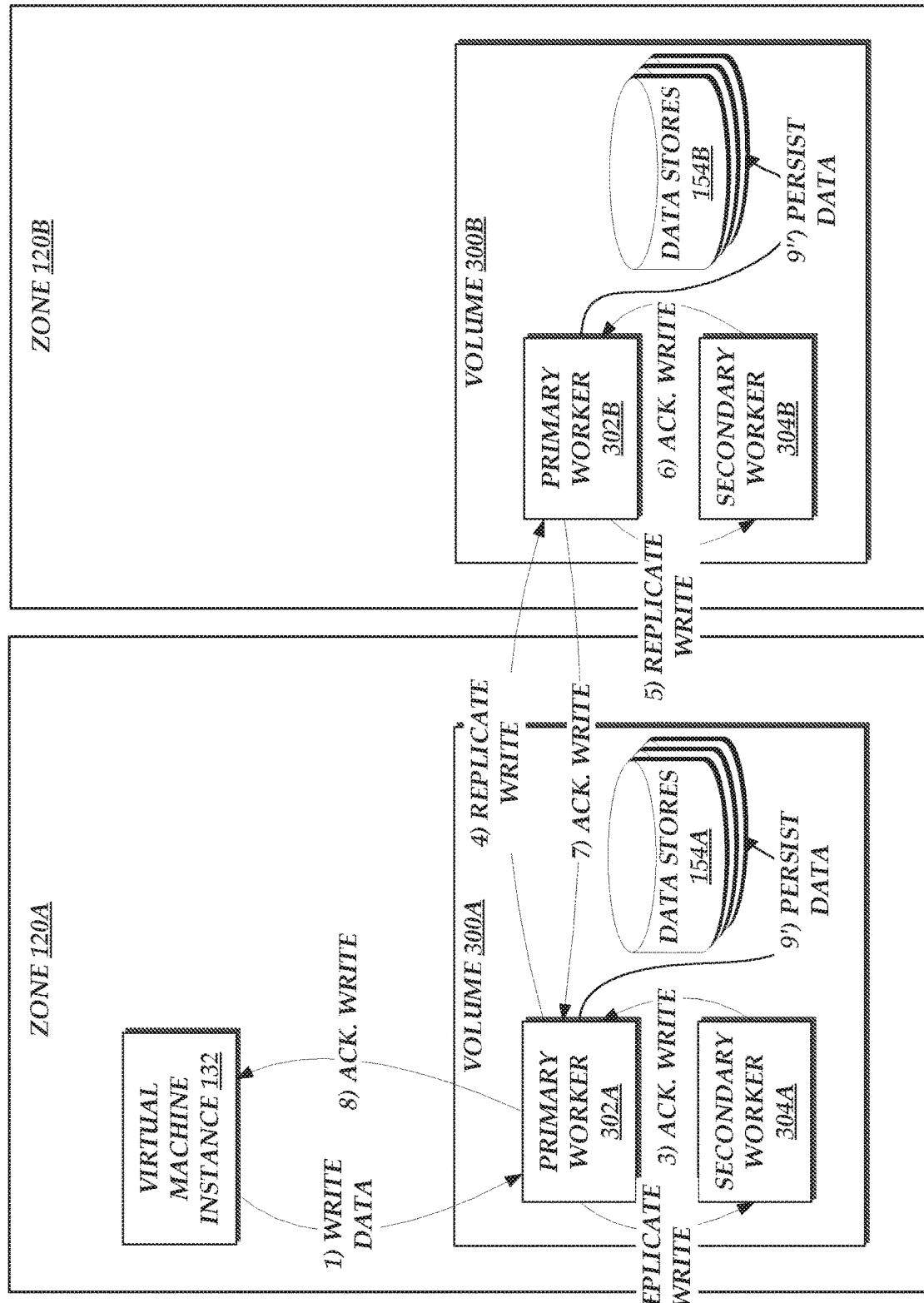
FIG. 3 depicts an example workflow for handling writes to virtualized, cross-zone block storage devices in accordance with aspects of the present disclosure.

With reference to FIG. 3, example interactions will be described for handling write operations to a cross-zone data storage device will be described. The interactions illustratively occur subsequent to "attachment" of the cross-zone data storage device to an instance 132, such that the instance can utilize the cross-zone data storage as a hard disk. As shown in FIG. 3, the cross-zone data storage device is implemented as two volumes 300A-B, each of which resides in a different zone 120A-B. One of the two volumes 300, and specifically volume 300A, has been designated as a "primary" volume, and thus services reads to and writes from the cross-zone data storage device by the instance 132. The second volume 300B is designated as a secondary volume. While two volumes are shown, any number of secondary volumes may be provided (e.g., all as equal secondary volumes, or as a tertiary volume, quaternary volume, quinary volume, etc.). Each volume 300 is implemented by two workers, designated in FIG. 3 as a primary worker 302 and secondary worker 304. The primary worker 302 is designated to handle reads from and writes to the volume 300, while the secondary worker 302 provides redundancy for the primary worker 302. In some cases, a worker may be referred to by its status at a zonal level and at a volume level. For example, primary worker 302A may be referred to as the "primary-primary" given its primary worker status within the primary volume. Primary worker 302B may be referred to as the "secondary-primary" given its primary worker status in the secondary volume, etc.

Illustratively, an instance 132 may attach cross-zone data storage by utilizing an identifier of the cross-zone data storage device to identify the primary worker 302A in the primary zone 120 (zone 120A), and initiating communication with the primary worker 302A. Thereafter, the instance 132 may interact with the worker 302A over a network, in a manner similar to locally-attached disks.

As such, at (1), the instance 132 writes data to the cross-zone data storage device by transmitting the write to the primary worker 302A. As discussed above, the worker 302A is illustratively configured to maintain the write as a log entry within a journal. In order to ensure resiliency of the write, the worker 302A is further configured to propagate the write to both the secondary worker 304A of the primary volume 300A, and to the secondary volume 300B. Thus, at (2), the primary worker 302A replicates the write to the secondary worker 304A, which may in turn store the write in its own log journal, and acknowledge receipt of the write to the primary worker 302A, at (3).

In addition, at (4), the primary worker 302A also replicates the write to the volume 300B, by sending the write to the primary worker 302B of the secondary volume 300A. In a manner similar to interactions (2) and (3), the primary worker 302B of the secondary volume 300B, at (5), replicates the write to the secondary worker 304B, which may in turn store the write in its own log journal, and acknowledge receipt of the write to the primary worker 302B, at (6). The primary worker 302B of the secondary zone 120B then acknowledges the write to the primary worker 302A of the primary zone 120A, at (7). After receiving acknowledgement from both the secondary worker 304A and the secondary volume 300B, the primary worker 302A acknowledges the write to the instance 132 at (8). Thereafter, the primary workers 302 "flush" their log journals to their respective data stores 154A, 154B, persisting the data to the stores 154A, 154B, at interactions (9') and (9").

While interactions (2) and (3) are numbered prior to interactions (4) through (7), these interactions may occur at least partly concurrently. For example, the primary worker 302A may replicate the write to both the secondary worker 304A and the secondary volume 300B simultaneously or directly in sequence. For security purposes, communications between workers 152 can illustrative occur over an encrypted communication channel, such as a Transport Layer Security (TLS) compliant channel.

As can be seen in FIG. 3, the interactions therein result in synchronous writes to both volumes 300, meaning that the data of the primary volume 300A is expected to remain consistent with the data of the secondary volume 300B (e.g., the two volumes 300 are "in sync"). Such a system is beneficial, as the instance 132 can be configured to consider data as persisted to the cross-zone storage device only on receiving acknowledgement of a write. Thus, failure of even an entire zone 120 would not be expected to result in data loss on the cross-zone storage device.

One potential drawback of synchronous writes to a cross-zone storage device is latency. Because writes must be acknowledged by each of the four workers 302A-B and 304A-B, latency in communications between these workers (and particularly between workers of different zones 120) could be detrimental to the speed of operation of the cross-zone device. As such, some embodiments of the present disclosure may modify the timing or order of the interactions of FIG. 3 to result in at least partially asynchronous writes. For example, the primary worker 302 and secondary worker 304 within a zone 120 may operate synchronously, but the primary worker 302 of a primary zone 120 may replicate writes asynchronously to another zone 120. Thus, in FIG. 3, interaction (8) may occur for example prior to interaction (7) (and potentially before interactions (4-6)).

In some embodiments, other combinations of asynchronous and synchronous writes may occur. For example, the primary worker 302A, secondary worker 304A, and primary worker 302B may operate synchronously, while the primary worker 302B asynchronously replicates writes to the secondary worker 304B (e.g., such that interaction (7) can occur prior to interaction (6)). In some instances, whether workers interact synchronously or asynchronously may be dynamically and programmatically modified by the zonal and/or regional control planes 160, 170 and/or workers 152. For example, each worker 302, 304 may periodically transmit information to the respective control planes 160, 170 (e.g., to the zonal volume manager service 162 and regional volume manager service 172) indicating a latency with other connected workers 302, 304 (e.g., a number of milliseconds observed at the primary worker 302A between replicating a write to a secondary worker 304A or secondary volume 300B and receiving a response). The respective control planes 160, 170 (and/or workers 152) may then determine based on these metrics whether the respective workers 302, 304 should operate synchronously or asynchronously.

For example, if communications between a primary worker 302 and a secondary worker 304 are observed as requiring more than n milliseconds (where n is a specified threshold, potentially specified by a user of the instance 132 or an operator of the cloud provider system 110), then the zonal volume manager service 162 may instruct the primary worker 302 to replicate writes asynchronously to the secondary worker 304A, or the primary worker 302 may independently determine to replicate writes asynchronously. Similarly, if communications between a primary worker 302 of a primary zone 120 and a primary worker 302 of a secondary zone 120 are observed as requiring more than n milliseconds (where n is a specified threshold, potentially specified by a user of the instance 132 or an operator of the cloud provider system 110), then the regional volume manager service 172 may instruct the primary worker 302 of a primary zone 120 to replicate writes asynchronously to the primary worker 302 of the secondary zone 120, or the primary worker 302 may independently determine to replicate writes asynchronously. When writes are programmatically altered from synchronous to asynchronous, the instance 132 may be notified, such that an end user can be warned that data loss may occur in the event of a system failure, due to asynchronous replication.

As will be described in more detail below, the zonal and/or regional control planes 160, 170 can additionally function to reconfigure the volumes 300 within a cross-zone storage device and/or the workers 302, 304 providing such a volume 300 based on the state of the volumes 300 and/or workers 302, 304. For example, where communication between a primary worker 302 and a secondary worker 304 and fails or is significantly degraded (e.g., in terms of exceeding a threshold metric of degradation, such as in terms of packet loss, latency, lack of bandwidth, etc.), the zonal control plane 160 may reconfigure the volume 300A to utilize a different secondary worker 304A, or may designate the secondary worker 304A as a new primary worker, and designate a different worker as a new secondary worker. Failure recovery scenarios within a zone 120 are discussed in more detail in the '330 Publication, incorporated by reference above.

In the case of inter-zone failures, the regional control plane 170 may operate to programmatically alter a configuration of the volumes 300A. For example, where communications to a secondary volume 300 fail or are degraded (e.g., in terms of exceeding a threshold metric of degradation, such as in terms of packet loss, latency, lack of bandwidth, etc.) but the primary volume 300 remains operational, the regional control plane 170 may implement a routine to create and failover to a new secondary volume 300 in different zone 120 than the primary volume 300 (which may be the same zone 120 as the past secondary volume 300 or a different zone 120, particularly in the case of zone-wide failure). Where communications between a primary volume 300 and a secondary volume 300 fail or are degraded due to failure at a primary volume 300, the regional control plane 170 may implement a routine to designate the past secondary volume 300 as the new primary volume 300, and to create and failover to a new secondary volume 300 in different zone 120 than the new primary volume 300. In some instances, modification of the primary volume 300 for a cross-zone storage device may occur only on explicit request by a user of an instance 132, since such failures are expected to be rare and may implicate larger system-wide failures. Routines for failover of volumes are discussed in more detail below.

While FIG. 3 depicts one example configuration for replication across volumes, other configurations are possible. For example, while the primary worker 302A of the primary volume 300A is depicted as replicating to the primary worker 302B of the secondary volume 300B, in some configuration the secondary worker 304A of the primary volume 300A may instead be configured to replicate writes to the primary worker 302B of the secondary volume 300B. As an additional example, while the primary worker 302B of the secondary volume 300B is depicted as replicating writes to the secondary worker 304B, in some instances writes may be replicated to both the primary worker 302B and the secondary worker 304B by the same source (e.g., the primary worker 302A or the secondary worker 304B). Thus, the specific channels of communication shown in FIG. 3 may vary across embodiments.

While the interactions of FIG. 3 relate to writes, a primary worker 302A may also be configured to service reads from a volume. In some instances, any primary worker 302A from any volume 300, including the secondary volume 300B is enabled to service reads. In still other instances, any worker 302, 304 is enabled to service reads.

Example Interactions for Creation of Cross-Zone Storage Devices

Figure 4:
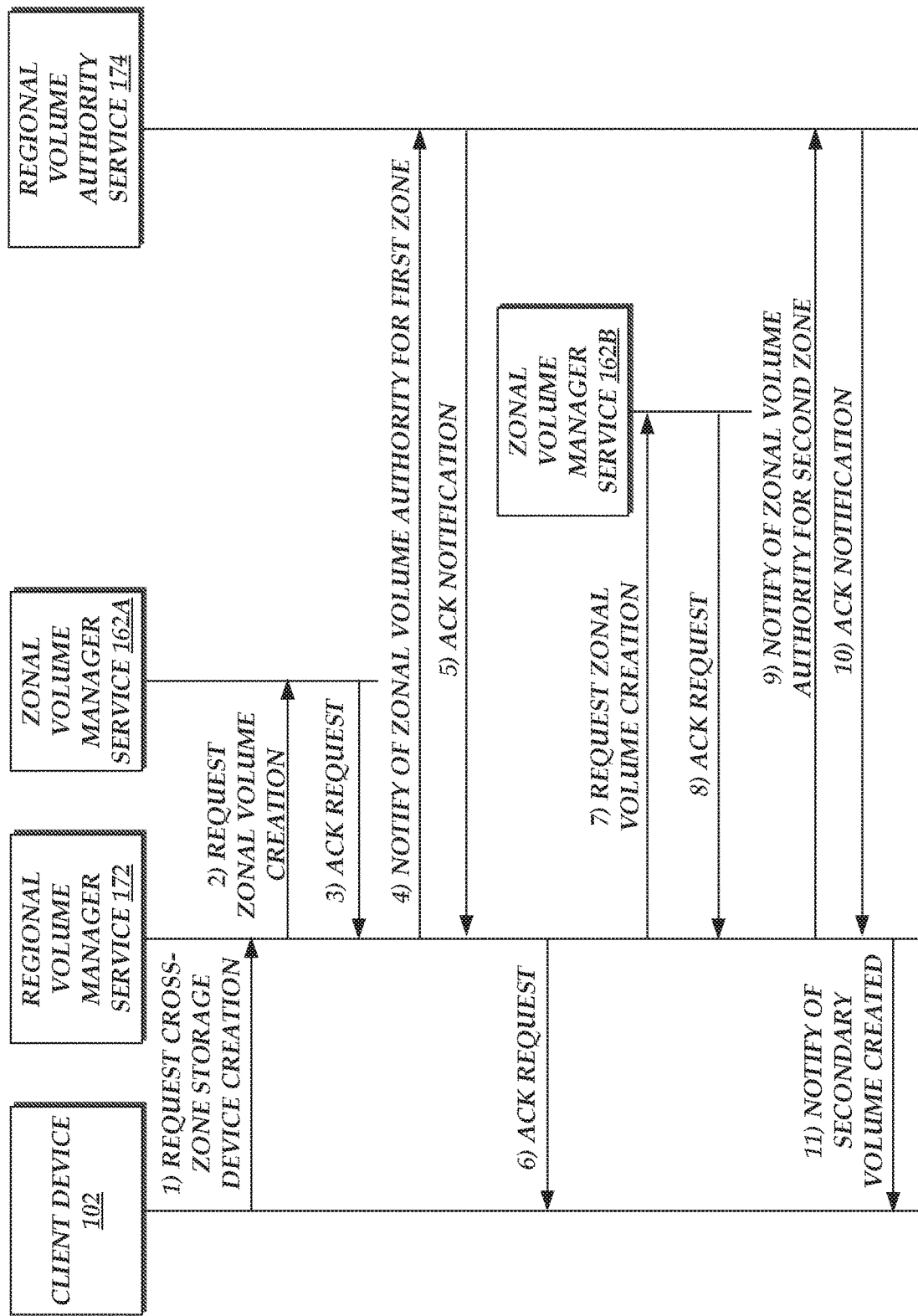
FIG. 4 depicts an example workflow for creating virtualized, cross-zone block storage devices in accordance with aspects of the present disclosure.

With reference to FIG. 4, illustrative interactions will be described for generating a cross-zone data storage device. The interactions begin at (1), where a client device 102 submits a request for creation of the cross-zone device. Illustratively, the regional control plane 170 may provide an application programming interface (API) or other interface (e.g., a graphical or command line interface) through which the client device 102 submits the request. While not shown in FIG. 4, the regional volume manager service 172 may take action to validate the request, such as by ensuring the client device 102 is authenticated and authorized to create a cross-zone storage device.

Thereafter, the regional volume manager service 172 interacts with zonal volume manager services 162 of two zones 120, in order to create both a primary volume for the cross-zone device in a first zone and a secondary volume for the device in a second zone 120. Specifically, at (2), the regional volume manager service 172 sends a request to the zonal volume manager service 162A to create a volume within the zone of the service 162A. Creation of a volume for the cross-zone device may occur similarly to creation of a volume intended to be used as a standalone virtualized storage device (e.g., where a non-cross-zone device is implemented as a single volume). In brief, such creation may include, by the zonal volume manager service 162A, selecting two workers to designate as primary and secondary for the volume, configuring the two workers to implement the volume, and notifying the zonal volume authority service 164A of the authority of the primary and secondary workers with respect to the volume.

In some instances, a volume may be created on the basis of a prior snapshot (or point-in-time copy) of a volume, as stored for example at an external network-accessible object storage system. In such cases, creation of the volume may include obtaining data from the snapshot and copying the data to the volume. On example of a workflow for creating a volume from a snapshot (and particularly an encrypted volume) is described within U.S. patent application Ser. No. 15/952,743 to Kumar et al., entitled "ENCRYPTION BY DEFAULT IN AN ELASTIC COMPUTE SYSTEM" and filed Apr. 13, 2018 (the "'743 Application"), the entirety of which is incorporated by reference herein (e.g., at FIG. 3A of the '743 Application). Where encryption is not requested, such interactions may be simplified to exclude encryption and key management. Similarly, where creation from a snapshot is not requested (e.g., where the volume is created in an empty state), interactions to copy data from the snapshot may be excluded.

Thereafter, at (3), the zonal volume manager service 162A acknowledges the request to the regional volume manager service 172. The acknowledgement may include, for example, a volume identifier identifying the volume within the zone 125 of the zonal volume manager service 162A. In some instances, this acknowledgement may indicate that the zonal volume manager service 162A has obtained the request, but not that the volume has actually been created. Rather, in these instances, the zonal volume manager service 162A may transmit to the regional volume manager service 172 a second indication when the volume has been created.

At (4), the regional volume manager service 172 then sends a notification to the regional volume authority service 174 of the authority of the first volume (e.g., as created or being created by the zonal volume manager service 162A) as a primary volume for the cross-zone device. The regional volume authority service 174, at (5), acknowledges this notification. Thereafter, the regional volume manager service 172 acknowledges the request to the client device 102. In some instances, this acknowledgement may indicate to the client that the cross-zone storage device is "creating." On receiving notification from the zonal volume manager service 162A that the primary volume for the cross-zone device has created, the regional volume manager service 172 can notify the client device 102 that the cross-zone device is available to accept input and output. In some instances, the notification to the client may indicate that the device is in a "degraded" state (or similar status), if no verification of creation of a secondary volume for the cross-zone device has occurred. Illustratively, the acknowledgement of the request may include an identifier of the cross-zone device, which may be utilized by the client device 102 (or a VM instance 132) to access the cross-zone device (e.g., by querying the regional volume manager service 172 to obtain a volume identifier for the device, which in turn may be used to query the zonal volume manager service 162A for a primary worker of the volume, which may result in identifying information for the primary worker used to address reads and writes of the cross-zone device to the worker).

In addition, at interactions (7)-(11), the regional volume manager service 172 interacts with the zonal volume manager service 162B of a second zone 125 to create a secondary volume for the cross-zone device, and to update the regional volume authority service 174 with information indicating the authority of the volume in the second zone 125 as a secondary volume for the cross-zone device. Interactions (7)-(11) are generally similar to interactions (2)-(6) above, and therefore will not be described in detail. However, in some configurations, interactions (7)-(11) may differ from interactions (2)-(6) under failure conditions. For example, the regional volume manager service 172 may return an error to the client device 102 if any of interactions (2)-(6) fail, as no primary volume would then be functioning for the cross-zone device. In contrast, if interactions (7)-(11) fail, the cross-zone device might still appear functional to the client device 102 (e.g., because a primary volume exists, but not a secondary volume). Therefore, on failure of any of interactions (7)-(11), the regional volume manager service 172 may be configured to retry the interactions until a secondary volume for the cross-zone storage device is created. While interactions (7)-(11) are shown as subsequent to interactions (2)-(6), these interactions may in some embodiments occur at least partly concurrently.

On successful creation of the secondary volume, in addition to notifying the client device 102 that the cross-zone storage device is created and functioning, the regional volume manager service 172 may notify the zonal volume manager service 162A (e.g., in the zone 125 of the primary volume) of the volume identifier for the secondary volume, such that the primary worker of the primary volume can initiate communication with the primary worker of the secondary volume.

Example Interactions for Verifying Write Authority in Cross-Zone Storage Devices With reference to FIG. 5, example interactions will be described for verifying write authority in a cross-zone storage device. As discussed above, a cross-zone storage device can include a number of volumes, with at least two volumes existing in different zones 125 of a cloud provider system 110. Of these, one volume is designated as a primary volume, while other volumes are designated as secondary or lower priority volumes. Each volume can be implemented by at least two workers 152, one of which is designated as the primary worker for the volume. To facilitate consistency of data within the cross-zone volume, it is advantageous to have all writes to the volume handled by a single entity, such as the primary worker of the primary volume. However, because an advantage of cross-zone volumes is resiliency in the instance of failure, it is contemplated that the relative authority status of workers or volumes can change. For example, where a primary worker fails, a secondary worker can replace the prior primary worker as a new primary. Where a primary volume fails, a secondary volume can replace the prior primary volume as a new primary volume. In some instances, changes in relative authority may occur even outside outright device failures. For example, where network connectivity issues prevent or inhibit communication with a primary worker, authority may shift to a new primary worker (even if the prior primary worker itself is still functioning normally with respect to other functions than network communications). As such, it is beneficial to configure a primary worker to confirm, prior to accepting writes to a cross-zone storage device, that it continues to have authority as the primary worker for the primary volume.

In one embodiment, the primary worker operates to obtain periodic "leases" indicating its authorities. Leases may have a predetermined duration, such as n seconds (e.g., 3 seconds). In the case of cross-zone devices, a worker can be configured to accept writes to a cross-zone device only if it holds a lease as a member of a primary volume and a lease as the primary worker of that primary volume.

Thus, at interaction (1), the worker 152 requests from the zonal volume authority service 164 a lease as primary worker for the volume. The request may include, for example, an identifier of the volume and an identifier of the worker 152. In one embodiment, the request is sent responsive to receiving a notification that the worker 152 is the primary worker for the volume, such as from the zonal volume manager service 162 during creation of the volume.

At (2), the zonal volume authority service 164 verifies that the worker 152 is the primary worker for the volume. Illustratively, the zonal volume authority service 164 may include a key-value data store associating an identifier of the worker 152 to an identifier of the volume, which association may be changed based on commands received from the zonal volume manager service 162. Thus, if the service 162 initially selected the worker 152 as primary worker for a volume and has not since detected issues with the worker 152, the zonal volume authority service 164 is expected to verify that the worker 152 is the primary worker for the volume. Thus, at (3), the zonal volume authority service 164 returns a lease to the worker 152 as the primary worker for the volume. (In the case that interaction (2) fails, the authority service 164 may notify the worker 152 that it is not the primary worker, and the worker 152 may revert to the zonal volume manager server 162 for further task assignment.)

If the worker 152 succeeds in obtaining a lease as the primary worker, the worker 152 can further obtain a lease as the primary volume for the cross-zone device. Thus, at interaction (4), the worker 152 requests from the regional volume authority service 174 a lease as primary volume for the cross-zone device. The request may include, for example, an identifier of the volume and an identifier of the cross-zone device.

At (5), the regional volume authority service 174 verifies that the volume is the primary volume for the cross-zone device. Illustratively, the regional volume authority service 174 may include a key-value data store associating an identifier of the volume to an identifier of the cross-zone device, which association may be changed based on commands received from the regional volume manager service 172. Thus, if the service 172 initially selected the volume as primary volume for the cross-zone device and has not since detected issues with the volume, the regional volume authority service 174 is expected to verify that the volume is the primary volume for the cross-zone device. Accordingly, at (6), the regional volume authority service 174 returns a lease to the worker 152 as the primary volume for the cross-zone device. (In the case that interaction (5) fails, the authority service 174 may notify the worker 152 that it is not the primary volume, and the worker 152 may revert to the regional volume manager server 172 for further task assignment.)

Thereafter, at (7), a virtual machine instance 132A (e.g., having previously "attached" to the volume implemented by the worker 152) writes data to the volume. Prior to accepting the write, the worker 152, at (8), verifies its authority is the primary worker for the primary volume. Because the worker 152 holds valid leases from the zonal and regional volume authority services 164 and 174, verification succeeds, and the write is acknowledged at (9). (While not shown in FIG. 5, acknowledgement of a write may include additional interactions, such as replication of the write to both a secondary worker and secondary volume, as discussed above.)

Figure 5:
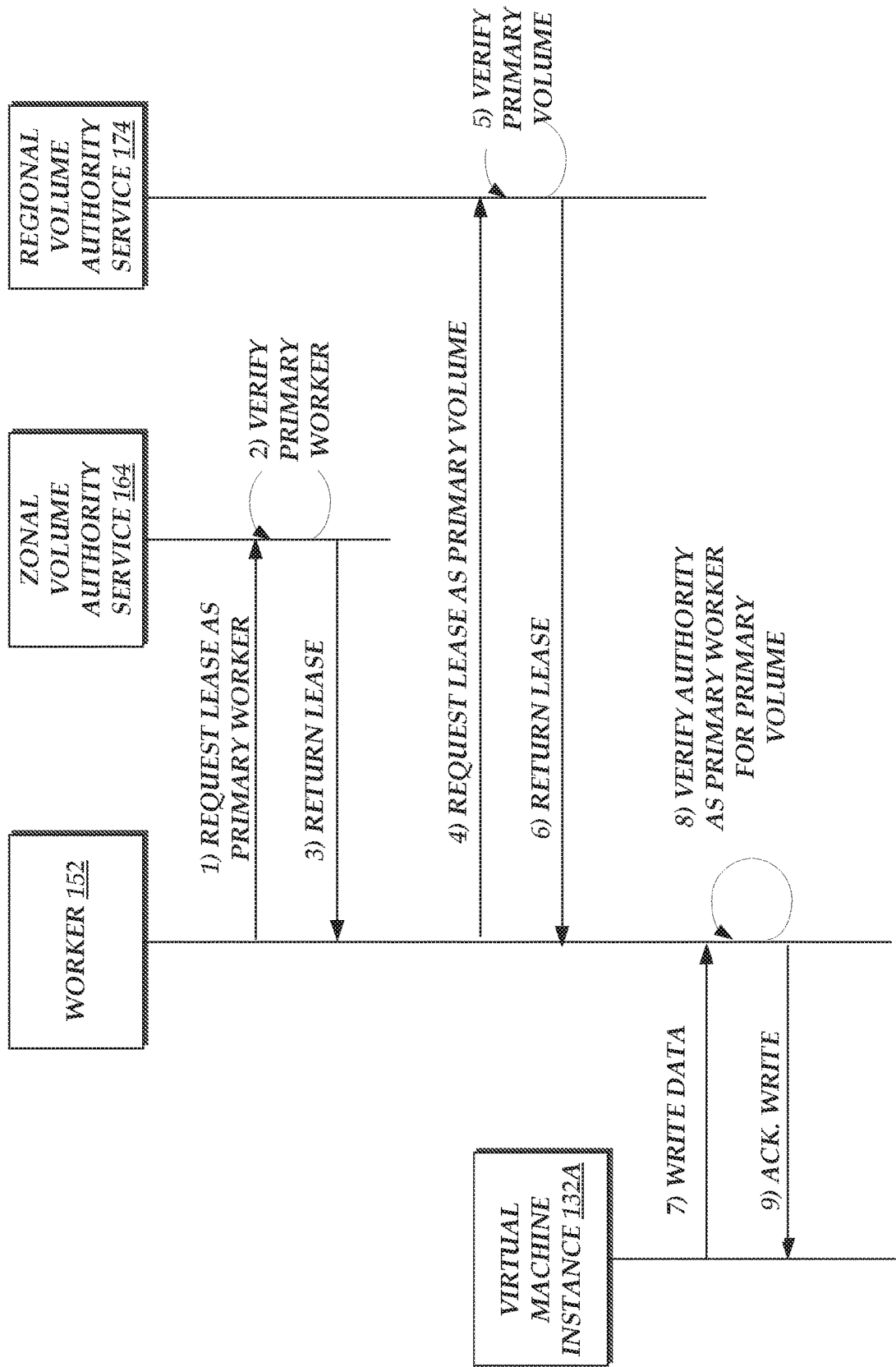
FIG. 5 depicts an example workflow for validating authority of a computing device to handle writes to a virtualized, cross-zone block storage device in accordance with aspects of the present disclosure.

While shown as a series of interactions in FIG. 5 for ease of explanation, these interactions may in practice be implemented as distinct routines. For example, interactions (1)-(6) may be implemented as a first routine, while interactions (7)-(9) are implemented as a second routine. The first routine may be implemented, for example, on receiving notification at a worker 152 (e.g., from a zonal volume manager service 162) that it has been designated a primary worker on a cross-zone storage device. The second routine may illustratively be implemented on receiving a write from an instance 132. The first routine may additionally or alternatively be implemented on receiving a write from an instance 132 (e.g., in the instance that the worker 152 has not yet been notified of a new status as primary worker). Moreover, in some instances, verification of authority of a worker 152 as the primary worker for the primary volume may occur at other times, such as on receiving a request from an instance 132 to "attach" a cross-zone block storage device to the instance 132.

Example Interactions for Replicating Encrypted Data

Figure 6:
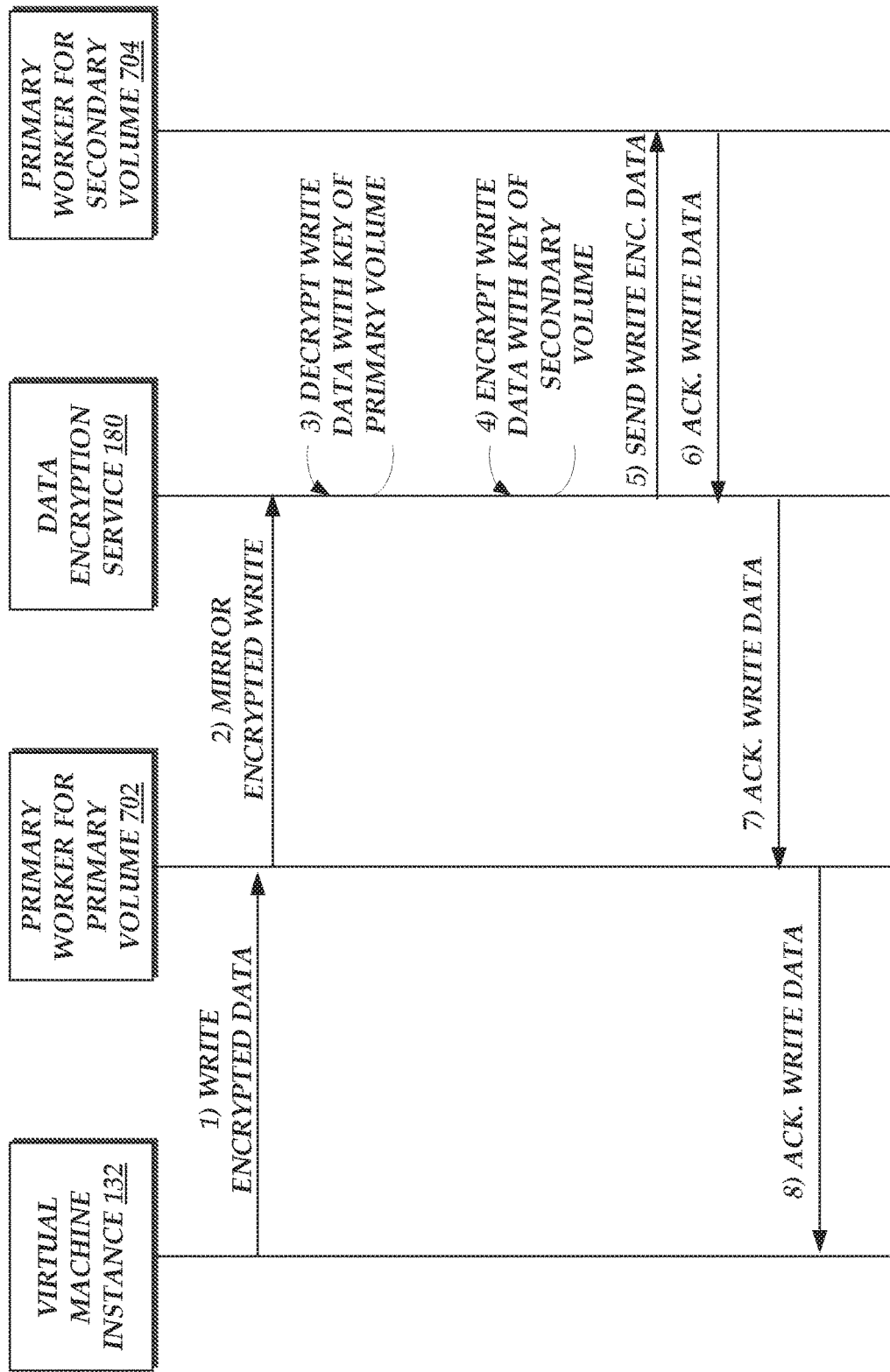
FIG. 6 depicts an example workflow for providing multiple encryptions across a virtualized, cross-zone block storage device in accordance with aspects of the present disclosure by reencrypting data replicated across volumes of the device.

As discussed above, in some instances data written to a cross-zone storage device is encrypted prior to writing (e.g., by the instance 132 or a host device). The instance 132 or host device may illustratively obtain a key used to encrypt the data from the key management service 190. One option for replicating encrypted data to multiple volumes across zones 125 is to store data in each volume encrypted according to the same key. Such a configuration may simplify replication, as the same data stored on a primary volume can be stored on the secondary volume. However, this configuration may limit separability of volumes. Accordingly, another configuration may be used, in which data stored in each volume is encrypted using a different key. While this configuration increases separability of volumes, it also generally requires reencryption of data prior to storing in secondary volumes. Illustrative interactions for such reencryption are depicted in FIG. 6.

Specifically, at (1), a virtual machine instance 132A writes encrypted data to the primary worker for the primary volume 702. In the instance that data is encrypted at the secondary volume using the same key, the worker 702 might simply replicate the data to the secondary volume. However, to enable data to be encrypted at the secondary volume using a different key, the worker 702 instead mirrors, at (2), the write to the data encryption service 180 (e.g., an instance of the service 180 in the same zone 125 as the primary volume 702 or in the zone 125 of the secondary volume).

In one embodiment, to facilitate ease of communication between the encryption service 180 and the primary worker 702, the encryption service 180 may be configured to present interfaces (e.g., APIs) similar or identical to those of a primary worker. Thus, from the point of view of the primary worker 702, the data encryption service 180 may represent a primary worker for a secondary volume. For example, in the instance that data of a cross-zone storage device is not encrypted, a primary worker for a primary volume may connect directly to a primary worker for a secondary volume. In the instance that the data of the cross-zone device is encrypted, the primary worker for the primary volume may connect to the data encryption service 180 as if that service 180 were the primary worker for the secondary volume, and the service 180 may in turn connect the primary worker for the secondary volume 704. Such connection may occur, for example, during creation of an encrypted cross-zone storage device.

In one embodiment, to facilitate security, the data encryption service 180 may host isolated execution environments for each encrypted cross-zone data storage device. For example, the service 180 may include a virtual machine instance, container, or thread specific to a particular cross-zone storage device, thus reducing a risk that data of the device is exposed to unauthorized parties.

At (3), the data encryption service 180 decrypts the written data using the key of the primary volume, which key may be obtained for example based on interaction with the key management service 190. In addition, at (4), the data encryption service 180 encrypts the written data using the key of the secondary volume, which key may also be obtained from the key management service 190.

After reencrypting the data with the key of the secondary volume, the service 180 replicates the data to the primary worker for the secondary volume 704, at (5), for storage within the secondary volume. The primary worker for the secondary volume 704 acknowledges the write to the service 180, which in turn acknowledges the write to the primary worker for the primary volume 702, which in turn acknowledges the write to the instance 132, at interactions (6)-(8).

Because acknowledgement of the write occurs to the instance 132 only after reencryption and replication of the data to the secondary volume, the interactions of FIG. 6 represent a synchronous reencryption process. However, in some instances, replication may occur at least partly asynchronously. For example, in some instances data may be replicated to the service 180 synchronously, which may then write the data to the secondary volume asynchronously, enabling the instance 132 to obtain acknowledgement of a write without delay due to reencryption. As discussed above, in some instances write replication may occur entirely asynchronously, with the primary worker for the primary volume 702 acknowledging a write without delay due to replication. In some configurations, whether replication is synchronous or asynchronous may be determined programmatically, such as based on delays caused by replication.

For further security, communications between workers 152 and the data encryption service 180 can illustrative occur over an encrypted communication channel, such as a Transport Layer Security (TLS) compliant channel.

Example Interactions for Handling Failed Workers

As discussed above, a benefit of replicated data is resiliency, such that data is not lost or inaccessible due to device failures. As such, it is contemplated that in some instances a worker of a volume may fail or degrade, and a new worker would replace the prior worker. For example, a zonal volume manager 162 may be configured to monitor performance of a volume, and in the case of degraded performance of a worker, to reassign a new worker to the past workers task. Additionally or alternatively, workers 152 or virtual machine instances 132 may operate to monitor performance of workers 152, and to attempt to initiate a failover when failure of a worker 152 occurs. For example, a primary worker may request from the zonal volume manager service 162 a new secondary worker when such secondary worker fails, or a virtual machine instance 132 may attempt to connect to a secondary worker when attempts to reach a primary worker have failed.

In the instance of a failed secondary worker, a primary worker may continue to accept reads from and writes to the volume, and thus no interruption to operation of the volume would occur. However, in the case of a failed primary worker, it may be necessary for a secondary worker to take the role of primary worker in order to ensure continuous operation of the volume while a new worker is assigned to the volume (e.g., as a new secondary). FIG. 77 depicts example interactions for failover from a primary worker to a secondary worker in the case of a failed or degraded primary worker. For ease of description, the interactions will be described with respect to a primary volume of a cross-zone device. However, similar interactions may be utilized in the case of failure of a primary worker of a secondary volume in a cross-zone device.

Figure 7:
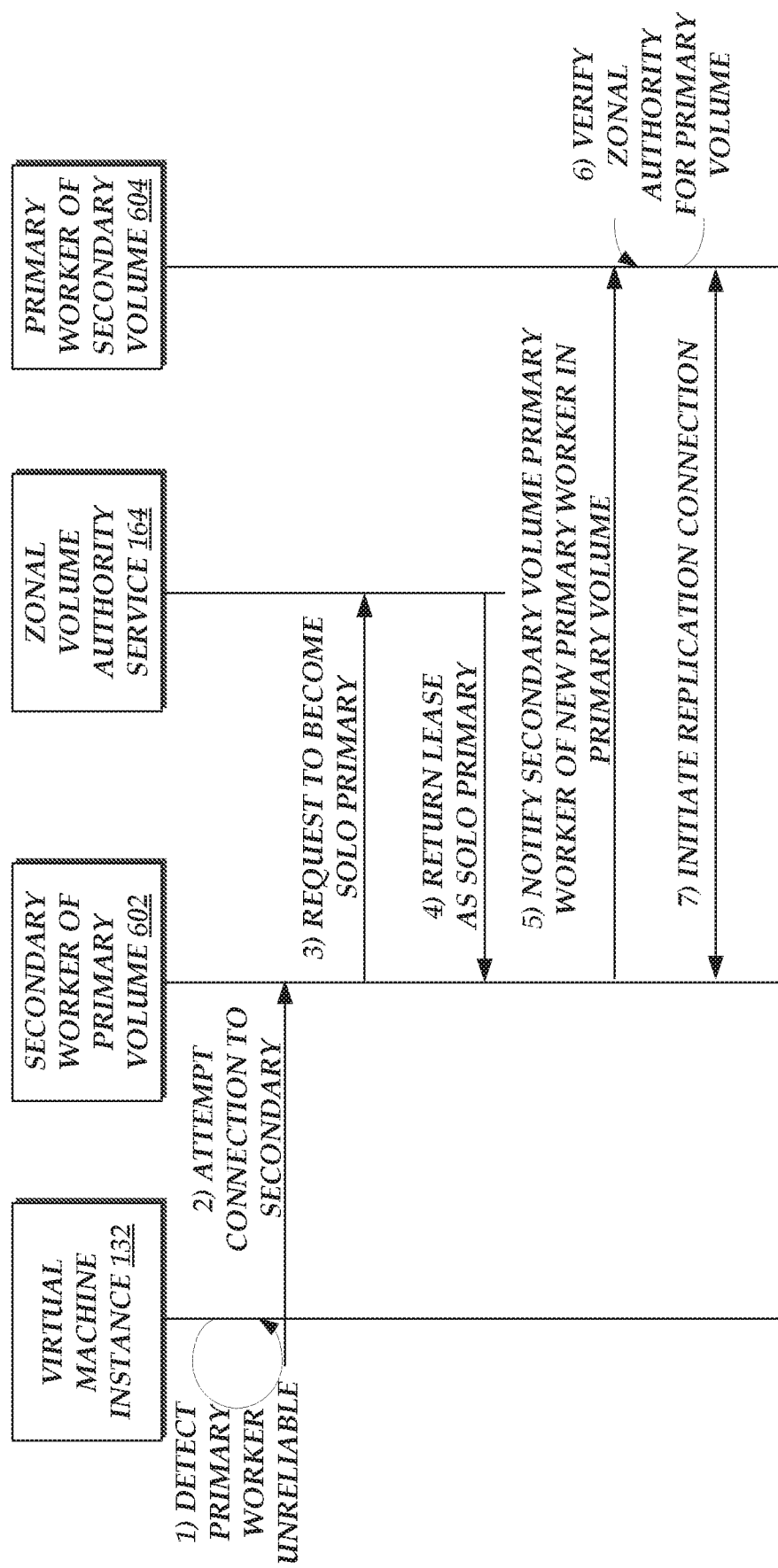
FIG. 7 depicts an example workflow for handling failures of a device implementing a volume of a virtualized, cross-zone block storage device in accordance with aspects of the present disclosure.

The interactions of FIG. 7 begin at (1), where a virtual machine instance 132 detects that a primary worker for a cross-zone device has become unreliable. Illustratively, the instance 132 may utilize a network address of the primary worker as an endpoint for the cross-zone device, and detect that attempts to communicate with the endpoint have been unsuccessful. The instance 132 may thus, at (2), attempt to connect to a secondary endpoint for the device, corresponding to the secondary worker. Additionally or alternatively, the zonal volume manager service 162 may detect that the primary worker of a volume is unreliable. The instance 132 and/or zonal volume manager service 162 may utilize a variety of metrics to determine unreliability of a primary worker, such as by detecting that the worker is non-responsive or is offering below-threshold performance according to a performance metric, such as a number of failed writes, write time, etc. In the instance that a zonal volume manager service 162 detects that the worker is unreliable, the service 162 may utilize performance metrics for the worker obtained from various elements of the storage service 140, including workers 152, as well as other elements, such as instances 132. In the instance that the instance 132 detects that the primary worker has become unreliable, the instance 132 may utilize locally-known metrics for the worker.

Thereafter, at (3) e secondary worker 602, responsive to the request from the instance 132 to interact with the secondary endpoint for the device, submits a request to the zonal volume authority service 164 for a lease as the "solo" primary (e.g., a primary worker operating without a secondary for at least a temporary period), at (3). The zonal volume authority service 164 then updates its records to indicate the new primary worker for the primary volume (e.g., by issuing a new lease with a higher priority than a prior lease), and returns the lease at (4). In some cases, the authority service 164 may, prior to assigning the lease, verify the unreliability of the prior primary worker, such as by communication with the zonal volume manager service 162. (As discussed above with respect to FIG. 5, the newly appointed solo primary may additionally request a lease as the primary volume, in order to accept writes to the volume. This interaction is not shown in FIG. 7 for brevity.) On accepting the lease, the past secondary worker 602 (now primary worker) may accept reads from and writes to the volume.

In addition to obtaining a lease a primary worker, the worker 602 further notifies the primary worker of the secondary volume 604 of its new role as the new primary worker for the primary volume. While shown as a direct notification, in some instances, this notification may flow-through the regional control plane 170 and/or respective zonal control planes 160. For example, the worker 602 may notify the regional volume manager service 172 (either directly or through the zonal control plane of the zone 125 that includes the primary volume) of the changed primary worker, which the regional manager service 172 may pass to the primary worker of the secondary volume 604 (either directly or through the zonal control plane of the zone 125 that includes the secondary volume).

On accepting a lease as the new primary worker for the primary volume, with the primary worker of the secondary volume 604 having been notified of the new primary worker, the past secondary worker of the primary volume 602 (now primary worker of that volume) and the primary worker of the secondary volume 604 initiate a replication connection, such that writes to the cross-zone device are replicated across volumes.

Because the interactions of FIG. 7 can result in only a single worker operating for a volume (and thus a decrease in resiliency), additional interactions may be undertaken to add a worker to the primary volume, thus returning the volume to a state of implementation by two workers. For example, the zonal volume manager service 162 may locate an additional worker 152 to be assigned to the primary volume, and instruct the new primary worker to replicate unwritten journal entries, as well as metadata regarding how data of the volume has been stored in the data stores 154, to the new secondary worker. Resiliency of the cross-zone data store can thus be maintained.

Example Interactions for Handling Failed Volumes

Figure 8:
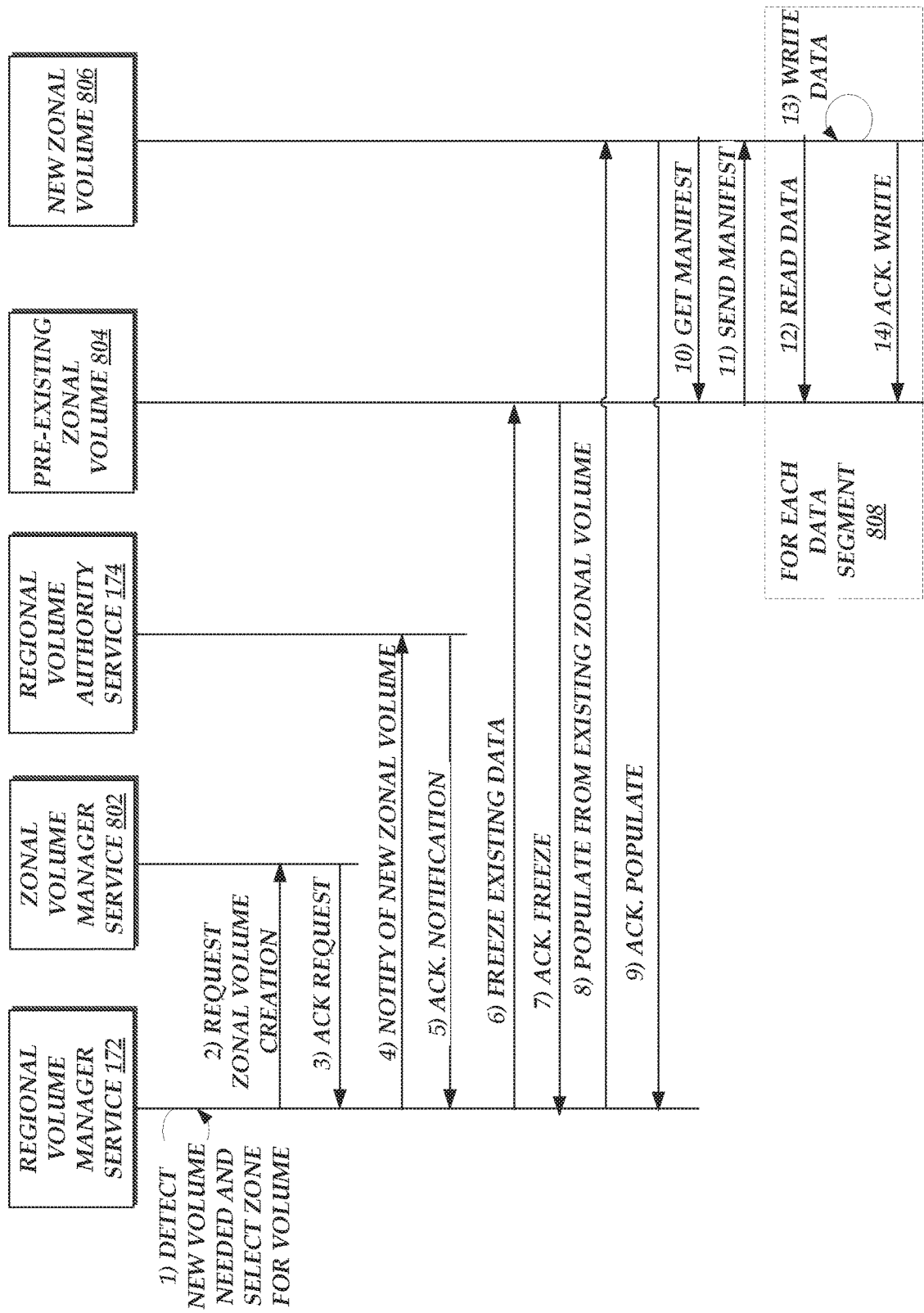
FIG. 8 depicts an example workflow for handling failures of a volume of a virtualized, cross-zone block storage device in accordance with aspects of the present disclosure.

The above-discussed interactions may be utilized to address failures of a worker implementing a volume. However, it is also contemplated that a cross-zone storage device may experience failures of an entire volume—and potentially, an entire zone 125. Thus, FIG. 8 depicts illustrative interactions for handling such failures.

The interactions begin at (1), where the regional volume manager service 172 detects that a new volume is required for a cross-zone device. In one embodiment, a new volume may be required when a prior volume (either primary or secondary) fails a performance metric threshold. As discussed above, the regional volume manager service 172 can be implemented as a distributed system operating across a number of zones 125, and thus the service 172 can be expected to continue to function even if an entire zone 125 ceases operation.

In addition, at (1), the regional volume manager service 172 selects a zone 125 in which to host the new volume. Illustratively, if a past failed volume existed in a given zone 125, and that zone 125 appears to be generally operational (e.g., devices within the zone 125 other than those implementing the past failed volume are reachable within performance metric thresholds), then the service 172 can be configured to select that given zone 125 to host a new volume. If a past failed volume existed in a zone 125 that appears to have entirely failed, the service 172 may select a different zone 125. Preferably, a zone 125 is selected that does not already include a volume for the cross-zone device. For example, where three zones exist for a cross-zone device of two volumes, the service 172 may select the remaining zone 125 that both is not failed and does not host the remaining volume of the cross-zone device. Where multiple such candidate zones 125 exist, the service 172 may select the zone 125 randomly or according to desirability metrics (e.g., cost, lack of failure correlation to another zone 125 hosting a volume of the device, etc.).

At (2), the regional volume manager service 172 transmits a request to the zonal volume manager service 802 of the selected zone 125 to create a new volume within the zone. The zonal volume manager service 802 then acknowledges the request at (3). In addition, at (4), the regional volume manager service 172 transmits to the regional volume authority service 174 a notification of the new zonal volume, as well as it's authority within the cross-zone volume. In general, it is expected that in the case of a failed volume, the remaining volume would be designated the primary volume, if necessary. For example, the regional volume manager service 172 may notify the zonal volume manager service for the remaining volume, which would in turn instruct the primary worker of that volume to request a lease from the regional volume authority service 174 as the primary volume. Thus, the notification at (4) would designate the new volume on the selected zone 125 as a secondary volume. The regional volume authority service 174 then acknowledges the notification at (5). Interactions (2)-(5) are thus largely similar to interactions (7)-(10) described above with respect to FIG. 4, and for brevity some details of these interactions have not been repeated.

However, in some instances it may be desirable for a failed primary volume to be replaced with a new primary volume. For example, where a primary volume in a given zone 125 fails (e.g., both a primary and a secondary worker fail), the interactions of FIG. 8 may be used to create a new volume within that same zone 125, designated as a primary volume. Because the primary volume initially would lack the data of the volume, a primary worker of the new volume may handle read requests to the cross-zone volume as "get faults." Accordingly, when obtaining a request to read data from the new primary volume that does not yet existing in the volume, a primary worker may request the data from the primary worker of a secondary volume, and return the data to the requesting client. In this manner, failures of primary volumes (e.g., that are not a result of failure of an entire zone 125) may be handled transparently, with little or no perceived operational issue to a client.

As discussed above, during creation of a new volume in a zone, the primary worker of a primary volume and the primary worker of a secondary volume can establish a connection such that writes across volumes are replicated. Thus, subsequent to interaction (5), the cross-zone device is expected to operate across multiple volumes, with writes once again being replicated across volumes. However, because the newly created volume does not include data previously written to the volume, resiliency of the data may be reduced.

Accordingly, at interactions (7)-(14), the newly created volume (which will for purposes of discussion be assumed to be a secondary volume) can be "hydrated" with data from the pre-existing volume (for purposes of discussion assumed to now represent a primary volume).

Specifically, at (7), the regional volume manager service 172 transmits an instruction to the pre-existing zonal volume 804 to "freeze" data of the volume, which is acknowledged at (8). A "freeze" of data may include ensuring that modification of the existing data of the volume is not altered after that point in time, such that the data is in a known state that can be replicated. Freezing of data does not necessarily indicate that writes to the volume 804 cannot occur, but rather simply that such writes to not modify the existing data. Illustratively, writes to the volume 804 may be handled as a "copy-on-write" operation, such that writes to the volume 804 are written to a new location of the data stores 154 rather than overwriting previously written data. Prior to initiating the freeze, the volume 804 may quiesce existing writes to volume, such as by a primary worker 152 persisting all writes to the volume to a data store 154. In some instances, freeze operations may be given high priority by workers 152, such that they can be completed quickly (e.g., in under 5 ms). Quick completion of a freeze may enable the operation to be invisible to a client device 102, such that little or no interruption of service occurs. In one embodiment, because the primary workers of the pre-existing and new zonal volumes 804, 806 have established a connection for replication of writes, the freeze occurs on a state of the data of the pre-existing volume 804 prior to any replicated writes between the the pre-existing and new zonal volumes 804, 806. In this way, the data as frozen, when combined with replicated writes to the pre-existing volume 804, enable the new zonal volume 806 to replicate a current state of the pre-existing volume 804.

In addition, at (9), the regional volume manager service 172 transmits a command to the new zonal volume 806 to populate the volume with data from the pre-existing zonal volume 804, which is acknowledged at (9). In accordance with this command, the new zonal volume 806, at (10), transmits a request to the pre-existing zonal volume 804 for a manifest of data segments within the frozen data. In one embodiment, data is stored to the data store 154 as blocks (which blocks may be the same or different from logical blocks written to the cross-zone storage device), and the manifest includes a list of all such blocks. The manifest is then transmitted to the new zonal volume 806 at (11).

Thereafter, the new zonal volume 806 implements the loop 808 for each data segment within the manifest. As shown in FIG. 8, the loop includes reading a data block in the manifest at (12), writing the data to the new zonal volume 806 at (13), and acknowledging the write to the pre-existing volume 804 at (14). Illustratively, acknowledging the write may enable the pre-existing volume 804 to unfreeze the data blocks (e.g., such that the blocks can be deleted when overwritten).

Because it is contemplated that the loop 808 may take considerable time (e.g., minutes, hours, or potentially days) to complete, it is also contemplated that writes to the cross-zone storage device may occur during the loop 808. Because these writes would represent newer (and thus more authoritative) data of the cross-zone device, the new zonal volume 806 can be configured to ensure that writing of data at loop 808 does not overwrite that newer data. Instead, data written at interaction (13) can be "underwritten" to the volume. For example, each write to the volume may be associated with an incrementing sequence number, which may be included in the replication of the write across volumes and maintained at the new zonal volume 806 as metadata for the written segment. The manifest provided at interaction (10) may also indicate, for each data segment, a sequence number at which the segment was last written. In the instance that interaction (13) attempts to write data to the new volume 806 that has a lower sequence than data already written (e.g., due to replication of writes), the new volume 806 can decline to overwrite that data. However, other data of the segment that was not written in that prior, higher priority write, may be written to the volume. In this manner, rather than overwriting a replicated write, loop 808 may lay data segments "under" those replicated writes. This operation can maintain consistency between the pre-existing zonal volume 804 and the new zonal volume 806. Thus, on completion of loop 808, the cross-zone storage device can be expected to be replicated across two volumes, ensuring resiliency of the device.

While the interactions of FIG. 8 enabling failover to a new volume in the instance of a volume failure, in some cases it may not be desirable to immediately designate a remaining volume as "primary" for the purposes of handling reads and writes. For example, in one configuration, services within zones 125 of the system 110 may be at least partially isolated, such that an instance of one service is configured to interaction with an instance of another service within the same zone (e.g., to decrease the "blast radius" of zone-scale failures). Illustratively, instances 132 may be configured to "attach" only to volumes implemented on a zone-local instance of the storage service 140. Accordingly, if a primary volume of a cross-zone storage device fails and another volume (of another zone 125) is designated as primary, instances 132 may be unable to connect to that other volume. Accordingly, it may be desirable to configure the storage service 140 such that switching of a primary volume for a cross-zone device must be manually initiated by a client. In some instances, failover to a new secondary volume may still occur without client-specification, in a similar manner to as described above, but the newly appointed primary volume may be configured to decline reads and writes until manually requested as primary by a client. In another instance, the interactions of FIG. 8 may occur only after manual request to switch primary volume by a client.

Figure 9:
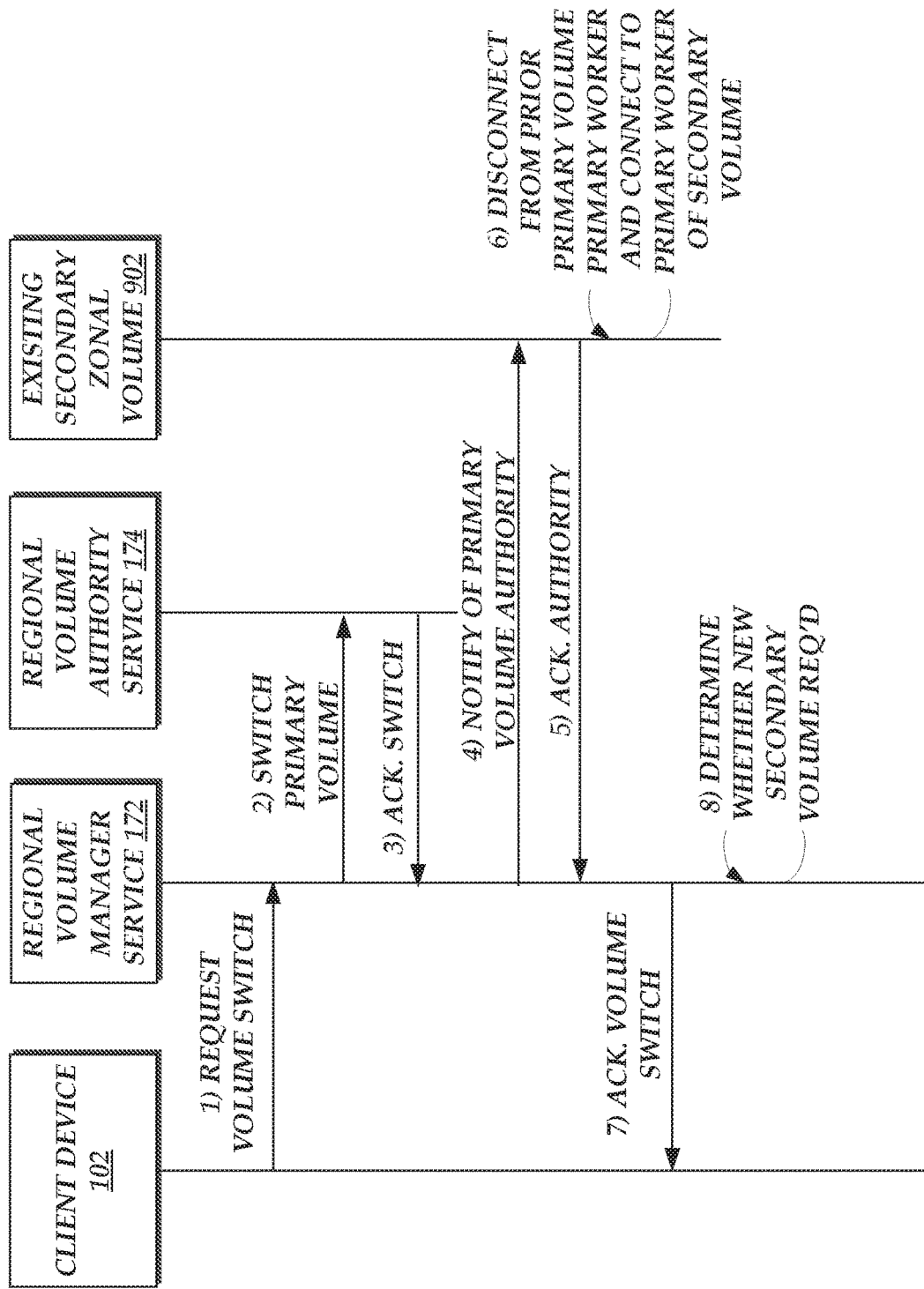
FIG. 9 depicts an example workflow for manually requesting a change in the primary volume of a virtualized, cross-zone block storage device in accordance with aspects of the present disclosure.

With reference to FIG. 9, illustratively interactions for handling a manual request to switch primary volumes are depicted. The interactions of FIG. 9 may be used, for example, to manually initiate the interactions of FIG. 8 in the case of a failed primary volume, or may be used for testing purposes by a client, to ensure that a secondary volume is able to take the role of a primary volume in the case of primary volume failure.

The interactions of FIG. 9 begin at (1), where a client device request is obtained at the regional volume manager service 172. The request may be obtained, for example, via an API or other interface provided by the regional control plane 170.

At (2), the regional volume manager service 172 responds to the request by transmitting a command to the regional volume authority service 174 to switch the primary volume for the cross-zone storage device from a past primary volume to a new primary designated within the request. The authority service 174 therefore updates its records to indicate that the volume designated within the request is now the primary volume for the cross-zone device, and acknowledges the switch, at (3).

At (4), the regional volume manager service 172 then notifies the existing secondary zonal volume 902 of its role as primary volume, which is acknowledged at (5). In its role as the new primary volume, the existing zonal volume 902 thus at (6) disconnects its existing replication connection from the prior primary worker of the primary volume (e.g., via which the zonal volume 902 previously received replicated writes from the primary volume), and connects to the primary worker of a secondary volume, if any. In the case of a volume switch without volume failure, for example, the existing zonal volume 902 may reconnect to the primary worker of the other (now secondary) volume but with replication being reversed. In the case of a volume switch with volume failure, it may be that no secondary volume exists, and thus connection would be deferred until creation of a secondary volume.

Thereafter, because the existing zonal volume 902 has been notified of its authority as the primary volume, the volume 902 can begin accepting writes to and reads from the volume. The regional volume manager service 172 thus, at (7), notifies the client of the successful volume switch.

In addition, at (8), the regional volume manager service 172 then determines whether a new secondary volume is required (e.g., if an existing volume has failed). If so, the service 172 may implement the interactions of FIG. 8, discussed above. In the case of a volume switch for testing purposes (e.g., when no volume failure has occurred), these interactions may not be required.

Example Interactions for Calculating Replication Lag Between Volumes

As discussed above, cross-zone storage devices may generally operate to replicate writes synchronously, such that writes are not acknowledged to a writing device (e.g., an instance 132) until the write has been replicated across zonal volumes. Synchronous replication may preferable, as it may minimize or eliminate loss of data in the event of a zonal volume failure. However, in some circumstances network conditions and write-responsiveness requirements may cause asynchronous replication to be preferable to a client. For example, a client may elect to incur some potential data loss due to asynchronous replication in order to obtain a reduced write latency provided by that replication. In such circumstances, it may be preferable that a client be aware of the scale of potential data loss, and be notified if that scale exceeds a threshold amount. While various metrics may be provided as to that scale, an intuitive metric for some clients may be a number of bytes potentially lost due to zonal failure (that is, the number of bytes stored within a primary volume but not yet replicated to a secondary volume). However, as is common in distributed systems, it is often difficult to maintain a consistent view of data at two distinct systems, particularly when a communication path between such systems incurs high latency or data loss (as may be expected to be the case when two volumes are utilizing asynchronous replication). Moreover, it may be difficult or impossible for a block storage system to determine an absolute difference between two distinct volumes at any given time. For example, where data is encrypted prior to being written to the volume, it may be difficult or impossible (or require insecure sharing of keys) for each volume to determine what data is truly duplicative between volumes or serial writes. Illustratively, where a writing device makes multiple encrypted writes each of which have not yet been replicated between volumes, it may be difficult absent decryption to determine whether such writes represent non-overlapping portions of the virtualized device (e.g., such that two writes of n bytes indicates a difference of 2n bytes between volumes), or whether such writes represent an overlapping portions (e.g., such that two writes of n bytes indicate a difference of only n bytes between volumes).

Embodiments of the present disclosure address these problems by enabling the calculation of metrics indicating replication lag between volumes. Replication lag may be represent by a number of metrics, including a time required to replicate a write between volumes, a number of writes currently "in-flight" (e.g., awaiting replication) between volumes, or a size of data difference between volumes. In accordance with embodiments of the present disclosure, these metrics may in some instances be calculated as estimates, since distributed networks or encryption may not allow for absolute accuracy. Nevertheless, such metrics may provide critical information to clients, enabling them to manage risk associated with asynchronous volume replication.

As will be described in more detail below, metrics for replication lag may be illustratively calculated by the regional volume manager service 172 of FIG. 1, based on metadata received from workers of each volume indicating data written by that worker. For example, where writes to volumes are log-based (e.g., utilizing a write journal, as described above), a primary worker of a primary volume may assign each write a sequence number, which number is then provided to the primary worker of a secondary volume. Each primary worker (e.g., of both a primary and secondary volume) may periodically report to the regional volume manager service 172 a latest write persisted to their respective volumes, as well as a time stamp associated with that write. The regional volume manager service 172 may then determine, for a given point in time, a difference between the latest write persisted at the primary volume and the latest write persisted at the secondary volume. In one configuration, each write may represent data of a predetermined size (e.g., a number of blocks, where each block represents a set number of bytes, such as n kilobytes). Thus, by multiplying the difference in latest writes between volumes by the byte-size of each write, the regional volume manager service 172 can calculate a potential difference in data persisted to the two volumes (and thus, a magnitude of potential data loss should the primary volume fail). Notably, in some configurations this potential difference may represent an over-estimate, as subsequent writes may in fact overwrite previous writes. However, for risk management purposes, an estimate scale of lost (and particularly, a worst-case estimate) may be acceptable to clients. In addition or alternatively to a size replication lag metric, the regional volume manager service 172 may provide other metrics. For example, the service 172 may calculate, for a given write (e.g., of a given sequence number) a difference in the time the write was persisted at the primary volume and the time the write was persisted at a secondary volume, indicating an amount of time required to persist the write to the secondary volume. Like the size replication lag metric, this time lag metric may represent an estimate, as perfectly synchronized notions of time in distributed systems may be difficult or impossible to maintain.

Figure 10:
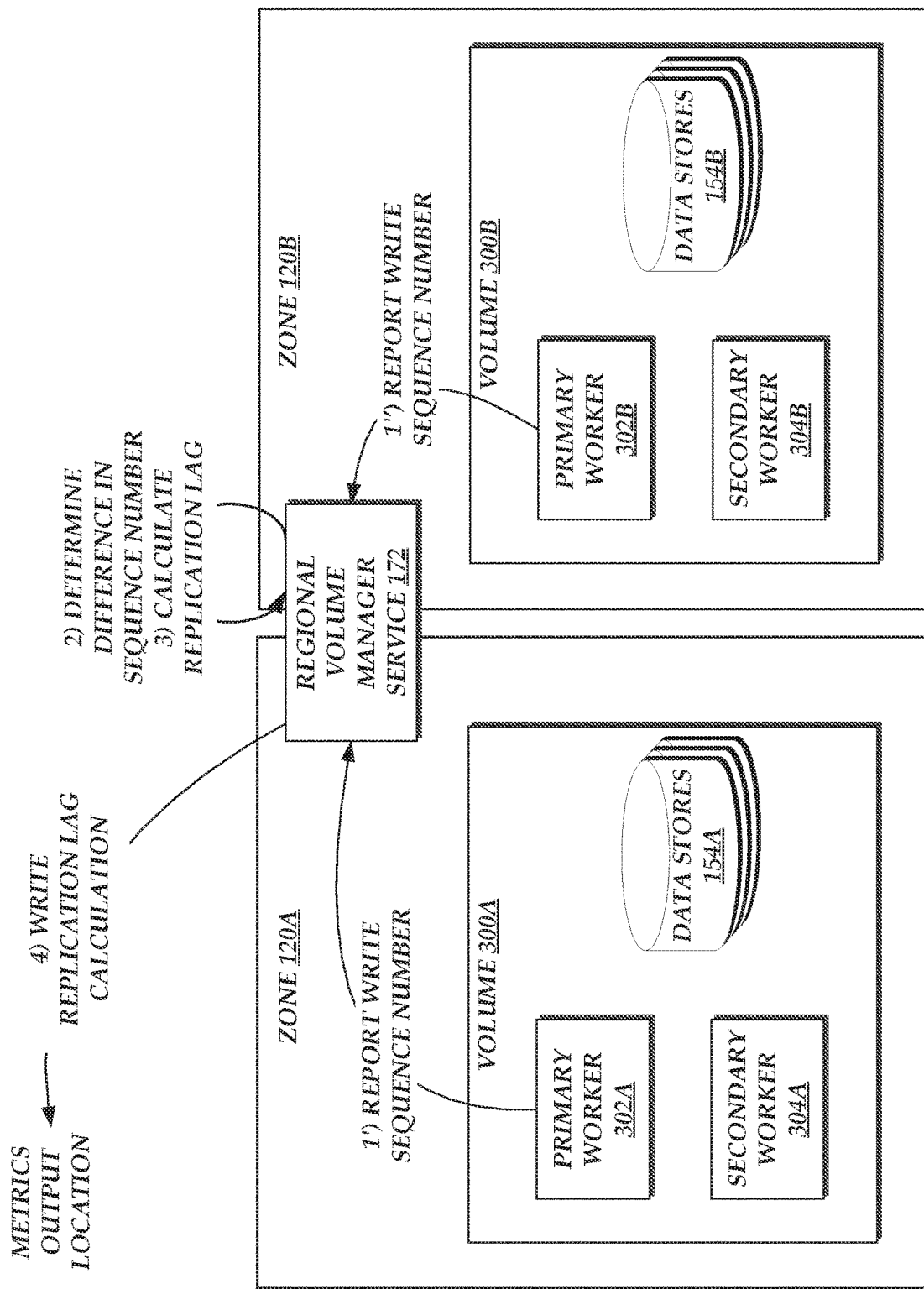
FIG. 10 is a flowchart of an example routine for handling writes to a virtualized, cross-zone block storage device in accordance with aspects of the present disclosure.

With reference to FIG. 10, illustrative interactions are shown for calculating replication lag metrics at the regional volume manager service 172 of FIG. 1. As shown in FIG. 10, each of a primary worker 302A of a primary volume 300A and a primary worker 302B of a secondary volume 300B, at (1') and (1") respectively, report write sequence number timing to the regional volume manager service 172. As discussed above, the regional volume manager service 172 is illustratively implemented as a distributed service, with one or more endpoints in zones 120A-B of the respective volumes 300A-B. Accordingly, each worker 302 may report it's write sequence number timing information to an endpoint of the service 172 in it's respective zone 120. Data for each volume 300 may then be propagated among the endpoints of the service 172. In one embodiment, the write sequence number timing includes a listing of a last write stored within the respective volumes 300, as well as a time of storage of that write. As discussed above, each write may be represented, for example, as a log entry within a write journal, corresponding to a write of one or more blocks of the cross-zone storage device. In some instances, the timing includes a history of more than one write stored within the respective volumes 300 (e.g., a last n writes), and associated timing of each write. To provide further accuracy, the internal clock time of workers 302 may, prior to the interactions of FIG. 10, be synchronized according to a network time synchronization protocol, a variety of which are known in the art.

At (2), the regional volume manager service 172 determines a difference in write sequence number stored at the respective volumes 300 at a given point in time. For example, if write x was stored at the primary volume 300A at a given time, and at that given time the latest write stored to the secondary volume 300B was write x-y, the calculated difference would be x-y. Given that the primary volume 300A is illustratively configured to replicate to the secondary volume 300B, this difference can be expected to be in the range of [0-n], where n is the number of writes that have occurred at the primary volume 300A.

At (3), the service 172 calculates a replication lag between the volumes 300A-B based on the difference in writes persisted at the volumes 300A-B at the given time. Illustratively, each write can correspond to a fixed data size, such as a fixed number of blocks each of a set number of bytes. Thus, by multiplying the difference determined at interaction (2) by the number of bytes in each write, an expected maximum difference between the data stored in the volumes 300A-B can be calculated. Notably, this difference can represent an expected maximum difference, as a possibility exists that multiple writes occur to the same data, thus overwriting that data.

While a byte size difference is calculated at interaction (3), in some instances the service 172 may calculate other differences. For example, rather than holding time constant for purposes of calculating a difference in writes (e.g., what sequence number represents a latest write for each volume 300A-B at a given time), the service 172 may hold a write sequence number constant for the purposes of calculating a replication lag time between volumes 300A-B. For example, the service 172 may determine for a given write sequence number the times at which the write was persisted to both the primary and secondary volumes 300A-B, and the difference between those times. This difference would indicate a time required to replicate the write between the volumes 300A-B, thus giving a different view of replication lag.

At (4), the service 172 writes the replication lag calculation to a metrics output location. The output location may illustratively be any network-accessible device configured to receive metrics. In one embodiment, the metrics output location is a network-based metrics storage service, which may illustratively be implemented by a virtual machine instance 132 (e.g., configured with software to receive metrics and make those metrics available to authorized devices). In another embodiment, the metrics output location may be a client device 102.

In some instances, interaction (4) may occur periodically, rather than immediately after interactions (1)-(3). For example, interactions (1)-(3) may occur at a given periodicity (e.g., every 3 seconds), and interaction (4) may occur at a second periodicity (e.g., every 30 seconds). In such an instance, each write to the metrics output location may include multiple calculated replication lag metrics. In some cases, the 172 may additionally or alternatively calculate statistical measurements of multiple calculated replication lag metrics, such as a mean or median metric, deviations of such metrics, or the like. Illustratively, the metrics output location may enable a client at a client device 102 to view such metrics and statistical measures. In some instances, views may include visualizations of metrics, such as distributions of metrics or statistical measures over time.

In one embodiment, an owner of a cross-zone device may specify notification thresholds for replication lag metrics. For example, while metrics may generally be output to a first location (e.g., a network-accessible device configured to receive, store, and display metrics), an owner may specify a second location to receive a notification should a given replication lag metric (or statistic related to such a metric) pass a threshold level. Illustratively, an owner may specify that if a maximum potential difference in data stored between volumes 300A-B exceeds n megabytes, that a notification should be provided to a second location, such as a client device. In one embodiment, such notifications can occur immediately on satisfaction of the threshold, and thus interaction (4) would occur on such satisfaction. The threshold level may be specified with respect to a value of the metric or statistic, independently on in combination with other criteria (e.g., exceeding a value for a given amount of time). Thus, while a single write is shown in FIG. 10, the service 172 may be configured to write replication lag calculations to multiple locations.

Example Routines

Figure 11:
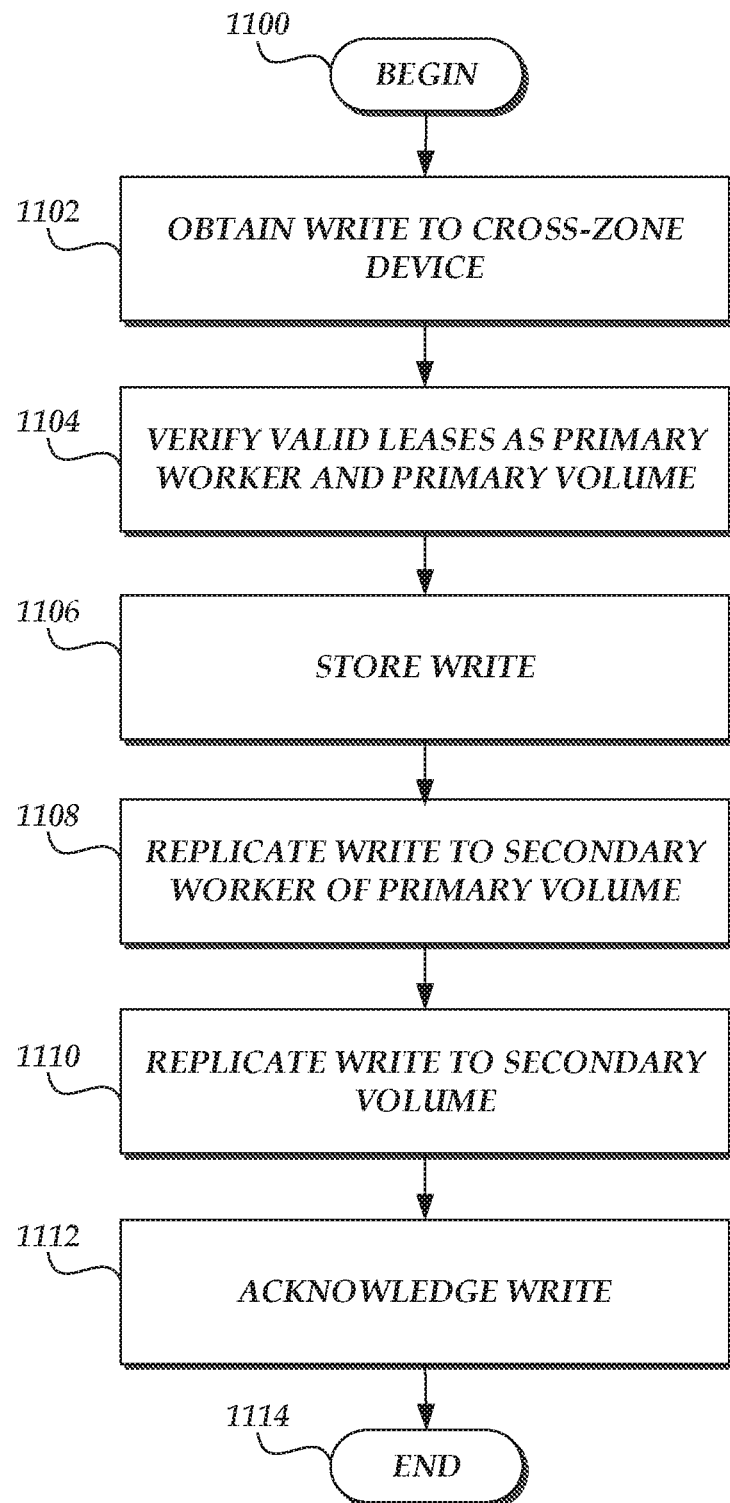
FIG. 11 is a flowchart of an example routine for handling failures of volumes on a virtualized, cross-zone block storage device in accordance with aspects of the present disclosure.
Figure 12:
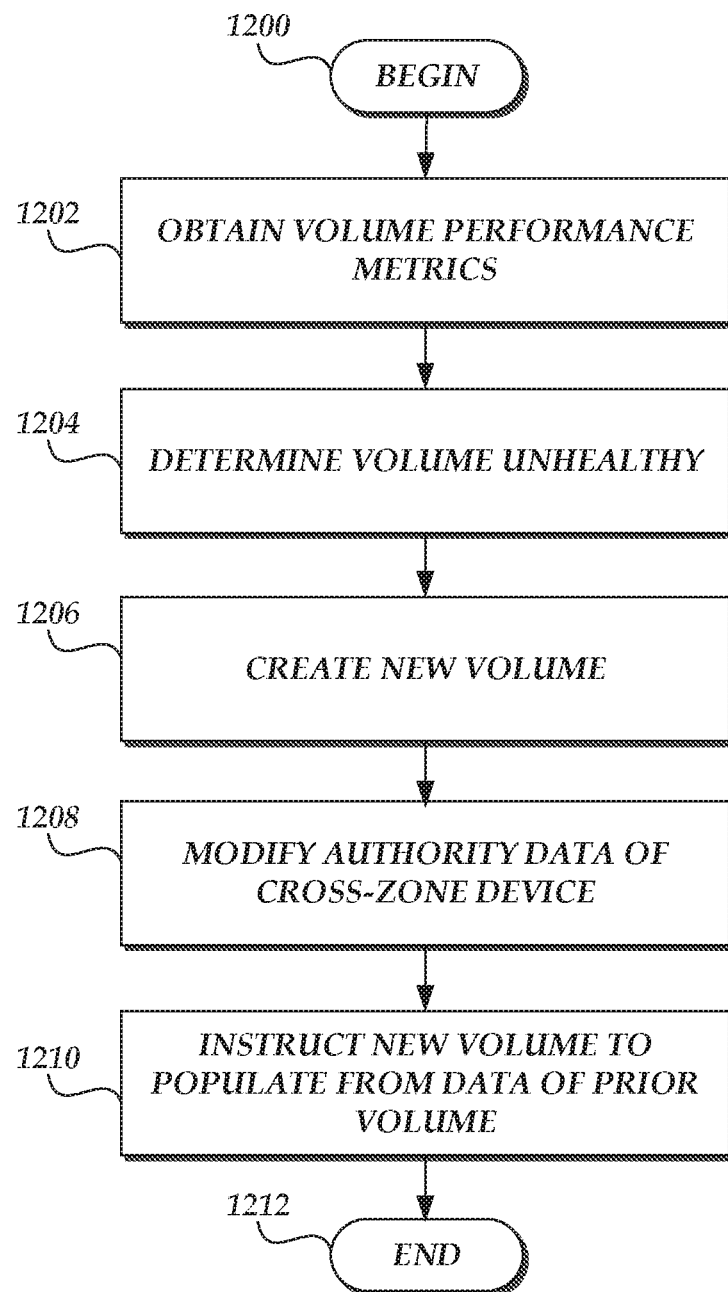
FIG. 12 is a flowchart of an example routine for handling reencryption of data during write replication between volumes on a virtualized, cross-zone block storage device in accordance with aspects of the present disclosure.
Figure 13:
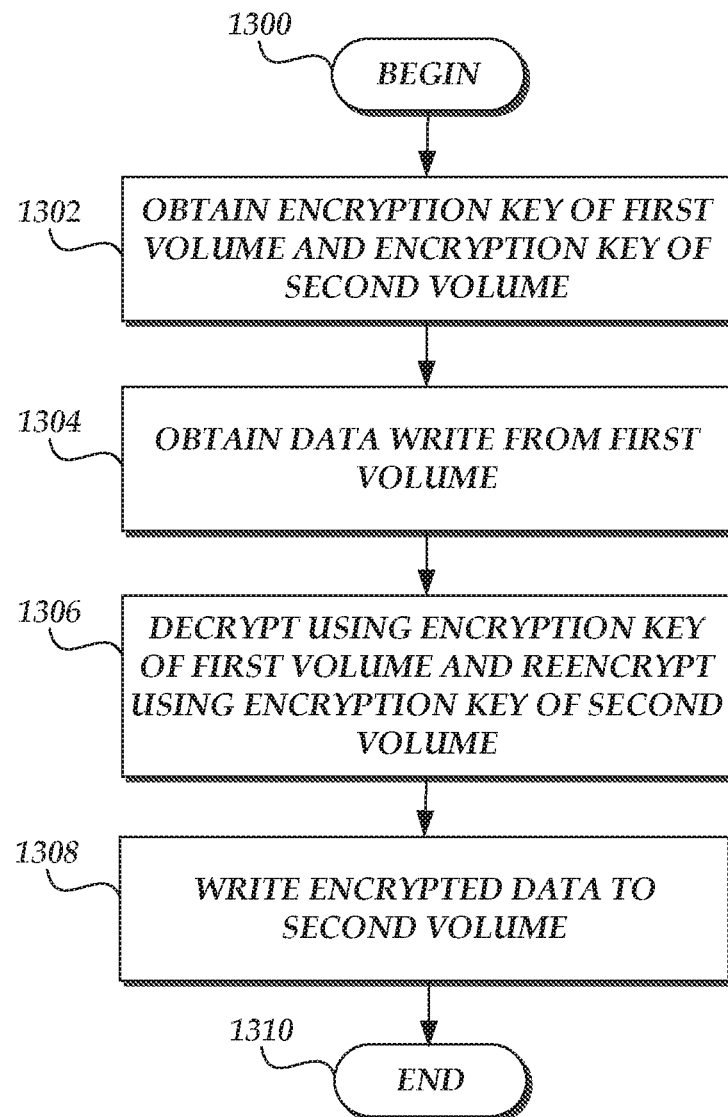
FIG. 13 depicts an example workflow for calculating replication lag between volumes of a virtualized, cross-zone block storage devices in accordance with aspects of the present disclosure.
Figure 14:
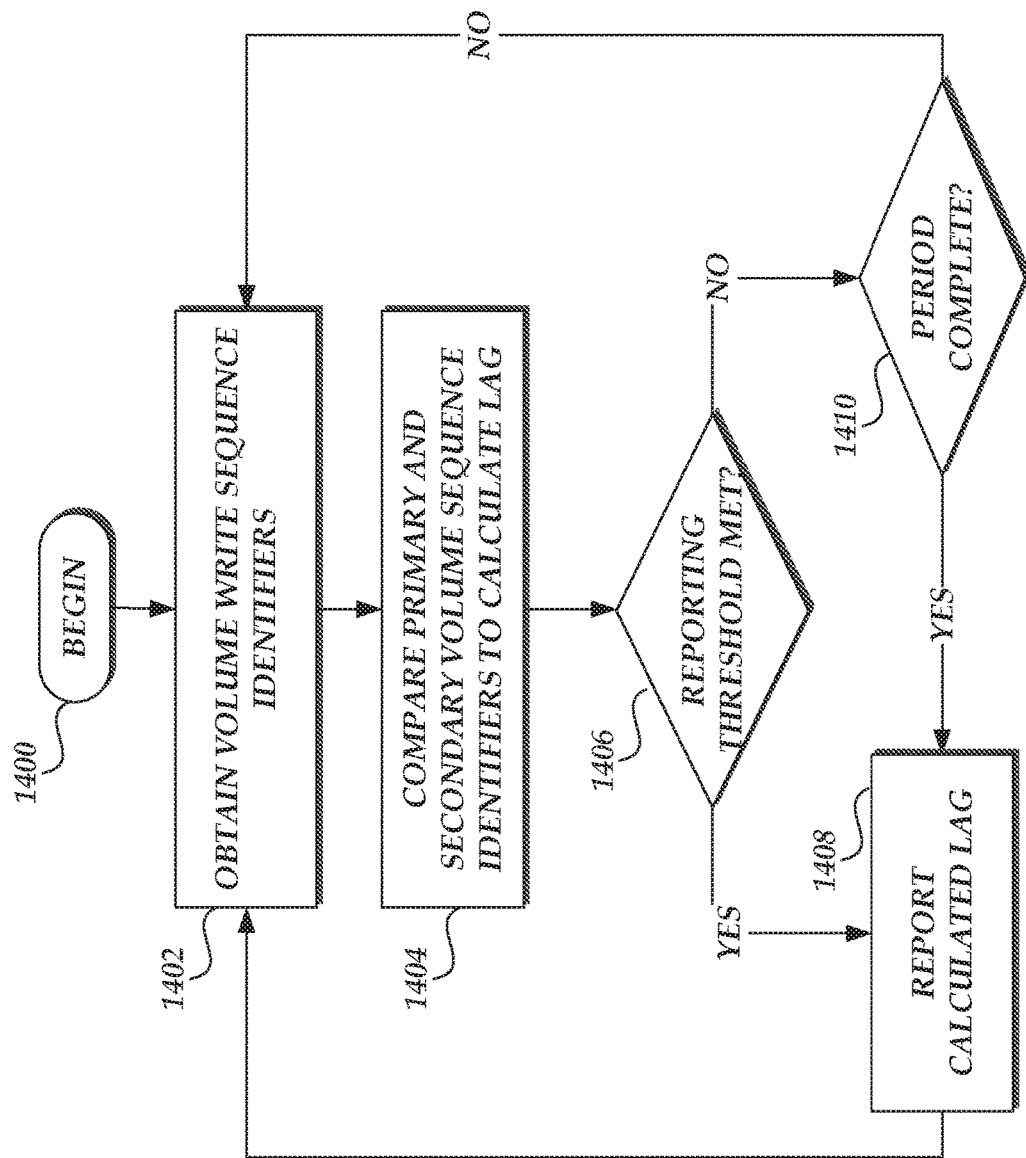
FIG. 14 is a flowchart of an example routine for providing metrics regarding replication lag between volumes of a virtualized, cross-zone block storage devices in accordance with aspects of the present disclosure.

With reference to FIGS. 11-14, illustrative routines will be described for implementing aspects of the present disclosure. Specifically, FIG. 11 depicts an illustrative routine for handling writes to a cross-zone storage device, which routine may be implemented by a primary worker of a primary volume of the cross-zone storage device. FIG. 12 depicts an illustrative routine for handling failures of a volume of a cross-zone storage device, which may be implemented by a regional control plane 170 coordinating operation of volumes in different zones. FIG. 13 depicts an illustrative routine for handling reencryption of data between volumes, to enable different encryption forms to be used at the different volumes, which routine may be implemented, for example, by a data encryption service 180 isolated from customer traffic. FIG. 14 depicts an example routine 1400 for providing metrics regarding replication lag between volumes of a virtualized, cross-zone block storage devices in accordance with aspects of the present disclosure.

With reference to FIG. 11, the routine 1100 begins at block 1102, where the primary worker obtains a write to the cross-zone storage device, such as from a virtual machine instance 132 (which, for purposes of the present discussion, represents a client of the storage service 140).

In response to the write, the primary worker, at block 1104, verifies that the worker has valid leases (e.g., from devices implementing zonal and regional authority services) as both primary worker of the volume, and as primary volume of the cross-zone device. Verification may include, for example, verifying that previously obtained leases remain valid. (In the instance that no valid lease exists, the primary worker may attempt to obtain valid leases from relevant authority services. If leases cannot be obtained, the worker may notify the client of failure to accept the write, and the routine 1100 may end.)

At block 1106, after verifying leases as primary worker to the primary volume, the primary worker stores the write. Illustratively, the write is stored as a log entry within a write journal, which the worker is configured to later persist to a data store (e.g., in erasure coded form). In another embodiment, the write is persisted at the primary worker directly.

At block 1108, after or concurrently with storing the write at the primary worker, the write is replicated to a secondary worker of the primary volume. The secondary worker and primary worker may illustratively be associated with a common storage node 150, such that the secondary worker may delete the written data after obtaining acknowledgement from the primary worker that the write has been persisted within the node. The secondary worker, during replication, illustratively acknowledges the write to the primary worker.

In addition, at block 1110 (which may occur concurrently, before, or after block 1108), the write is replicated to the secondary volume. In one embodiment, the primary worker directly replicates the write to a primary worker of the secondary volume. In another embodiment, where the secondary worker is configured to replicate writes to the secondary volume, the primary worker replicates the write to the secondary volume by use of the secondary worker, such as by transmitting the write to the secondary worker and awaiting acknowledgement from the secondary worker that the write has also been transmitted to the secondary volume. In yet another embodiment, the primary worker replicates the write to the secondary volume via an encryption service, which may be configured to encrypt the write with a key unique to the secondary volume. during replication, the primary illustratively obtains acknowledgement of the write to the secondary volume.

Thereafter, at block 1112, the primary worker acknowledges the write to the client device, indicating successful and resilient storage on the cross-zone device. In one embodiment, the primary volume and secondary volume are configured to operate synchronously, and thus block 1112 occurs only after obtaining acknowledgement of replication of the write to the secondary volume (and only after obtaining acknowledgement of replication of the write to the secondary worker of the primary volume). In another embodiment, the primary volume and secondary volume are configured to operate asynchronously, and thus block 1112 may occur prior to obtaining acknowledgement of replication of the write to the secondary volume. Thereafter, the routine 1100 ends at block 1114.

As noted above, FIG. 12 depicts an illustrative routine for handling failures of a volume of a cross-zone storage device, which may be implemented by a regional control plane coordinating operation of volumes in different zones. The routine 1200 of FIG. 12 begins at block 1202, where the regional control plane 170 obtains performance metrics of volumes of a cross-zone block storage device. Illustratively, workers of each volume may periodically report to the control plane 170 (e.g., to the manager service 172 or authority service 174) performance metrics for the volume and/or pertaining to inter-volume communication. For example, performance metrics may include time required to acknowledge customer writes, time required to obtain acknowledgement of replicating writes to another worker in the volume or to another volume, rate of non-acknowledged writes (e.g., requiring retries or representing errors), or similar metrics. These metrics may be represented as averages, medians, maximum or minimum values, or in a variety of other statistical measurements.

At block 1204, the control plane 170 determines that a volume of the cross-zone device is unhealthy or failed. In one instance, failure may be indicated by performance metrics of or associated with the volume (e.g., as obtained from the volume or obtained from another volume and pertaining to the volume) fail to meet threshold requirements. In another instance, failure may be indicated by a failure to timely receive performance metrics from the volume. While block 1204 is described as a failure or lack of health of the volume, it is contemplated that a volume could be unhealthy while the specific workers 152 implementing the volume continues to function. For example, a network partition condition could occur in which a particular zone 120 cannot communicate from other zones 120. In that case, a volume may appear to the control plane 170 to be unhealthy while still performing adequately within that zone 120. As discussed above, in one embodiment the control plane 170 is implemented as a distributed system utilizing quorum or consensus protocols and adopting a majority-view of the state of a volume. Thus, when a majority of the devices implementing the control plane 170 fail to communicate with a volume, the volume can be deemed unhealthy or having failed.

Accordingly, at block 1206, the control plane 170 creates a new volume from the cross-zone device, in order to ensure resiliency of the device. Implementation of block 1206 may include, for example, transmission of instructions to a zonal control plane 160 to create a new volume within a zone, which may result in creation of the volume and return to the control plane 170 of a volume identifier for the new volume. In one embodiment, implementation of block 1206 includes selection of a zone 120 in which to create a new volume. Illustratively, where a zone 120 including the failed volume has not itself failed, the control plane 170 can create the new volume in that zone 120. Where the zone 120 including the failed volume has failed, the control plane 170 may select an alternative zone 120 into which to place the new volume. Preferably, the new volume is placed into a non-failed zone that is different from zones 120 including other, non-failed volumes of the cross-zone device, such that the device maintains resiliency to zone-wide failures.

At block 1208, the control plane 170 modifies authority data of the cross-zone device, such as by modifying a data record in a regional volume authority service 174 and incrementing an authority counter for the record. As discussed above, this record may be utilized by workers of the device to verify roles with respect to implementing the device (e.g., as a primary or secondary volume).

Thereafter, at block 1210, the control plane 170 instructs the new volume to populate data from prior, non-failed volume of the device. As noted above, in one embodiment population utilizes an "underwriting" process, whereby the surviving volume is instructed to maintain a record of the state of the volume at a given point in time, while continuing to accept modifications to the volume (e.g., via a copy-on-write mechanism). The surviving volume may then continue to replicate writes to the volume after that point in time to the new volume, while also providing to the new volume segments from the point-in-time record. Each write to the surviving volume may be designated with a sequential write number, thus enabling the new volume to distinguish a relative priority of writes (with later writes having priority over earlier writes). Thus, when populating data to the new volume, the new volume may decline to overwrite data in the new volume associated with a higher priority write number, populating data from the point-in-time record "under" the data in the new volume recorded by virtue of writes occurring after that record. Accordingly, the new volume can be synchronized with the surviving volume, and the cross-zone storage device can be returned to a state of resiliency against zone-wide failures.

As noted above, FIG. 13 depicts an illustrative routine for handling reencryption of data between volumes, to enable different encryption forms to be used at the different volumes, which routine may be implemented, for example, by a data encryption service 180 isolated from customer traffic. The routine 1300 of FIG. 13 begins at block 1302, where the data encryption service 180 obtains an encryption key of a first volume (e.g., a primary volume) from which data encrypted according to a first encrypted form is to be received, and an encryption key of a second volume (e.g., a secondary volume) from which data encrypted according to a second encrypted form is to be transmitted. In one embodiment, the first and second keys represent keys used to encrypt data on the first and second volumes, respectively. The data encryption service 180 may illustratively obtain the key from the key management service 190 after authenticating with the service 190. To ensure security of the keys and data reencrypted via the service 190, the data encryption service 180 can illustratively be configured to reject any attempts to access the service from client devices 102 of from non-authenticated elements. In another embodiment, to provide additional security, the first and second keys may be different from those used to encrypt data at the first and second volumes. For example, the first and second keys may be negotiated between the data encryption service 180 and workers 152 of the first and second volumes, respectively, via a key-exchange protocol such as the Diffie-Hellman key exchange. The worker 152 of the first volume may encrypt data sent to the data encryption service 180 using a first negotiated key, for example, and the worker 152 of the second volume may decrypt data from the data encryption service 180 using a second negotiated key In this manner, access to the keys used to encrypt data at the first and second volumes may be limited, further increasing security.

At block 1304, the data encryption service 180 obtains data from the first volume, which was illustratively written to the first volume by a VM instance 132 attached to the volume, and is encrypted using the first key. In one embodiment, the data encryption service 180 may provide to the first volume an interface the same as or inter-compatible with an interface provided by secondary volumes, such that the first volume replicates writes to the data encryption service 180 (in the case of data encrypted according to different keys among volumes) in the same manner as direct replication of writes between volumes (in the case of unencrypted data or data encrypted with a single key among volumes). Thus, from the point of view of the first volume, the data encryption service 180 may appear as a second volume. In another embodiment, the data encryption service 180 may "pull" data from the first volume, by periodically requesting from the first volume writes that have not yet been replicated to a second volume. Pull configurations may be beneficial, for example, in handling asynchronous replication of writes, since asynchronous replication may be as time sensitive as synchronous replication.

At block 1306, data encryption service 180 decrypts the written data using the first encryption key associated with the first volume to result in decrypted data, and reencrypts the decrypted data using the second key associated with the second volume. In one embodiment, the data in its decrypted state is stored only in transient memory of the data encryption service 180 (e.g., RAM), to increase security of the data.

Thereafter, at block 1308, the data encryption service 180 writes the reencrypted data to the second volume, thus replicating the data written to the first volume while respecting the different encryption formats between the volumes. The routine 1300 then ends at block 1308.

As discussed above, in some instances the data encryption service 180 may operate to replicate writes between a first and second volume synchronously, by acknowledging receipt of data from the first volume only after obtaining acknowledgement of receipt of data at the second volume. In other embodiments, the data encryption service 180 may operate to replicate writes at least partially asynchronously, such as by acknowledging receipt of data from the first volume without awaiting acknowledgement of receipt of data at the second volume. For example, where the first volume and the data encryption service 180 are implemented in different zones 130, receipt of data at the data encryption service 180 may be sufficient to resiliently store that data, such that receipt of a write can be sent to a VM instance 132 by the first volume. Asynchronous responses from the data encryption service 180 to the first volume may advantageously speed acknowledgement of writes to a VM instance 132. In cases where asynchronous responses are sent from the data encryption service 180, multiple writes to the first volume may be handled simultaneously. For example, multiple writes may be encrypted as a single operation, increasing efficiency of the data encryption service 180. In some instances, multiple writes may be deduplicated by the data encryption service 180. For example, where multiple writes occur to the same address space (overwriting one another), the data encryption service 180 may discard all but a final write to the space, further increasing efficiency of operation.

As noted above, FIG. 14 depicts an example routine 1400 for providing metrics regarding replication lag between volumes of a virtualized, cross-zone block storage devices in accordance with aspects of the present disclosure. The routine 1400 can be implemented, for example, by the regional volume manager service 172.

As shown in FIG. 14, the routine begins at block 1402, where the service 172 obtains from two volumes of a cross-zone block storage device reports of writes persisted to those volumes. Each report may include, for example, a last one or more writes persisted to the volume (as identified by a sequence number of such a write), and the time that such a write occurred.

At block 1404, the service 172 compares the volume write reports to calculate a lag between the volumes. Illustratively, lag may be reflected in a size difference metric, reflecting a maximum expected difference in data stored at the two volumes. In such a case, the service 172 may determine a difference in the last write persisted to each volume at a given point in time, and multiple that difference by the data size of each write (e.g., 512 kilobytes, where each write is to a single block of that size). In another case, lag may be reflected in a time metric, reflecting a time required to replicate a given write between the two volumes. In such a case, the service 172 may determine a difference in the time at which the write, as identified with a given sequence number, was persisted at the two volumes. In some instances, the service 172 may additionally calculate statistical measurements of one or more lag metrics, such as a mean or median value for the metric over a given period, such as the past n seconds.

At block 1406, the service 172 determines whether the lag calculated at block 1404 exceeds a reporting threshold, such as a threshold established by an owner of the cross-zone storage device. Illustratively, such an owner may request notification if a given lag metric (e.g., replication time or maximum estimated difference) exceeds a threshold value. Accordingly, if the calculated lag metric exceeds that value, the routine 1400 proceeds to block 1408, where the calculated lag metrics (or statistics) are reported to a network-accessible location, such as a metrics data store or a client device. The routine 1400 then returns to block 1402.

If the reporting threshold is not met at block 1406, the routine 1400 proceeds to block 1410, where implementation of the routine 1400 varies according to whether a reporting period has completed. Illustratively, the service 172 may be configured to report calculated replication lag metrics at each period of n seconds. Thus, if a period has completed, the routine 1400 again proceeds to block 1408, as described above. In some instances, the location to which metrics are reported may vary according to the reason for reporting the metrics. For example, metrics reported due to meeting a reporting threshold may be delivered to a first location, while metrics reported due to completion of a reporting period may be delivered to a second location.

In the instance that the reporting period is not complete at block 1410, the routine 1400 returns to block 1402. As such, the routine 1400 is implemented as a loop, which may illustratively continue during operation of the service 172.

While the routine 1400 is described above as including the reporting of replication lag metrics, in some embodiments the service 172 may additionally or alternatively take other actions with respect to such metrics. For example, in some instances the service 172 may be configured to modify operation of a cross-zone block storage device when a metric exceeds a threshold value (e.g., set by an administrator of the service 172, an owner of the device, etc.), such as by considering a volume of the device to have constructively or actually failed when a replication lag metric exceeds a given threshold. Illustratively, in such a condition the service 172 may initiate creation of a new secondary volume for the device, and population of that new secondary volume with data of the primary volume. Example interactions for creation and population of a new secondary volume are described above with respect to FIG. 8. Accordingly, the blocks of the routine 1400 are intended to be illustrative in nature.

Example Computer System

Figure 15:
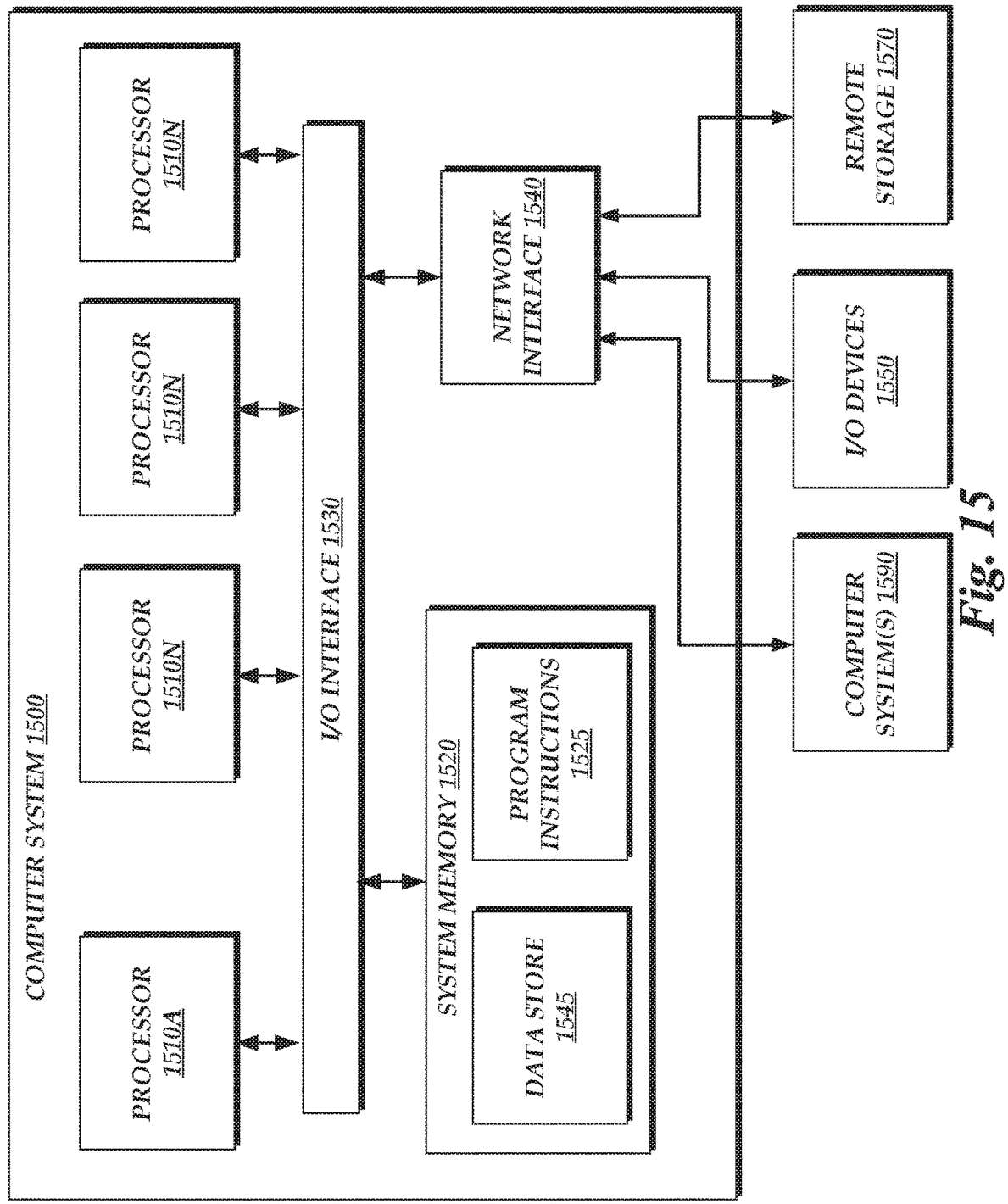
FIG. 15 depicts a schematic diagram of an example computing system.

FIG. 15 is a block diagram illustrating an example computer system, according to various embodiments. For example, instances of the computer system 1500 may be configured to implement host devices in the virtual compute service 150, workers 152 of the storage nodes 150, or elements of the zonal control plane 160, regional control plane 170, data encryption service 180, or key management service 190. Computer system 1500 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1500 includes one or more processors 1510 (any of which may include multiple cores, which may be single or multi-threaded) coupled to a system memory 1520 via an input/output (I/O) interface 1530. Computer system 1500 further includes a network interface 1540 coupled to I/O interface 1530. In various embodiments, computer system 1500 may be a uniprocessor system including one processor 1510, or a multiprocessor system including several processors 1510 (e.g., two, four, eight, or another suitable number). Processors 1510 may be any suitable processors capable of executing instructions. For example, in various embodiments, processors 1510 may be general-purpose or embedded processors implementing any of a variety of instruction set architectures (ISAs), such as the x86, PowerPC, SPARC, or MIPS ISAs, or any other suitable ISA. In multiprocessor systems, each of processors 1510 may commonly, but not necessarily, implement the same ISA. The computer system 1500 also includes one or more network communication devices (e.g., network interface 1540) for communicating with other systems and/or components over a communications network (e.g. Internet, LAN, etc.).

In the illustrated embodiment, computer system 1500 also includes one or more persistent storage devices 1560 and/or one or more I/O devices 1580. In various embodiments, persistent storage devices 1560 may correspond to disk drives, tape drives, solid state memory, other mass storage devices, block-based storage devices, or any other persistent storage device. Computer system 1500 (or a distributed application or operating system operating thereon) may store instructions and/or data in persistent storage devices 1560, as desired, and may retrieve the stored instruction and/or data as needed. For example, in some embodiments, computer system 1500 may act as a worker, and persistent storage 1560 may include the SSDs attached to that worker to facilitate storage of write journal entries.

Computer system 1500 includes one or more system memories 1520 that are configured to store instructions and data accessible by processor(s) 1510. In various embodiments, system memories 1520 may be implemented using any suitable memory technology (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1520 may contain program instructions 1525 that are executable by processor(s) 1510 to implement the routines, interactions, and techniques described herein. In various embodiments, program instructions 1525 may be encoded in platform native binary, any interpreted language such as Java byte-code, or in any other language such as C/C++, Java, etc., or in any combination thereof. For example, in the illustrated embodiment, program instructions 1525 may include program instructions executable to implement the functionality of a worker 152. In some embodiments, program instructions 1525 may implement a device of the zonal volume manager service 162, the zonal volume authority service 164, the regional volume manager service 172, or other elements of a zone 120 or the system 110.

In some embodiments, program instructions 1525 may include instructions executable to implement an operating system (not shown), which may be any of various operating systems, such as UNIX, LINUX, Solaris, MacOS, Windows, etc. Any or all of program instructions 1525 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1500 via I/O interface 1530. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1500 as system memory 1520 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1540.

In some embodiments, system memory 1520 may include data store 1545. In general, system memory 1520 (e.g., data store 1545 within system memory 1520), persistent storage 1560, and/or remote storage 1570 may store write journal entries, data blocks, replicas of data blocks, metadata associated with data blocks and/or their state, configuration information, and/or any other information usable in implementing the methods and techniques described herein.

In one embodiment, I/O interface 1530 may be configured to coordinate I/O traffic between processor 1510, system memory 1520 and any peripheral devices in the system, including through network interface 1540 or other peripheral interfaces. In some embodiments, I/O interface 1530 may perform any necessary protocol, timing or other data transformations to convert data signals from one component (e.g., system memory 1520) into a format suitable for use by another component (e.g., processor 1510). In some embodiments, I/O interface 1530 may include support for devices attached through various types of peripheral buses, such as a variant of the Peripheral Component Interconnect (PCI) bus standard or the Universal Serial Bus (USB) standard, for example. In some embodiments, the function of I/O interface 1530 may be split into two or more separate components, such as a north bridge and a south bridge, for example. Also, in some embodiments, some or all of the functionality of I/O interface 1530, such as an interface to system memory 1520, may be incorporated directly into processor 1510.

Network interface 1540 may be configured to allow data to be exchanged between computer system 1500 and other devices attached to a network, such as other computer systems 1590, for example. In addition, network interface 1540 may be configured to allow communication between computer system 1500 and various I/O devices 1550 and/or remote storage 1570 (which may represent, for example, data stores 154). Input/output devices 1550 may, in some embodiments, include one or more display terminals, keyboards, keypads, touchpads, scanning devices, voice or optical recognition devices, or any other devices suitable for entering or retrieving data by one or more computer systems 1500. Multiple input/output devices 1550 may be present in computer system 1500 or may be distributed on various nodes of a distributed system that includes computer system 1500. In some embodiments, similar input/output devices may be separate from computer system 1500 and may interact with one or more nodes of a distributed system that includes computer system 1500 through a wired or wireless connection, such as over network interface 1540. Network interface 1540 may commonly support one or more wireless networking protocols (e.g., Wi-Fi/IEEE 802.11, or another wireless networking standard). However, in various embodiments, network interface 1540 may support communication via any suitable wired or wireless general data networks, such as other types of Ethernet networks, for example. Additionally, network interface 1540 may support communication via telecommunications/telephony networks such as analog voice networks or digital fiber communications networks, via storage area networks such as Fibre Channel SANs, or via any other suitable type of network and/or protocol. In various embodiments, computer system 1500 may include more, fewer, or different components than those illustrated in FIG. 15 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing and/or storage services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Example Embodiments

Examples of the embodiments of the present disclosure can be described in view of the following clauses:

Clause 1. A system to provide data volumes replicated across at least two isolated computing systems, the system comprising:
  a first computing system storing a first replicated data volume implemented by at least a first computing device and a second computing device; and
  a second computing system storing a second replicated data volume implemented by at least a third first computing device and a fourth computing device, wherein the second computing system is in communication with the first computing system via a communication network but is electrically and physically isolated from the first computing system;
  wherein the first computing device is configured to:
    obtain from a client device a write to the first replicated data volume;
    store the write at the first computing device;
    replicate the write to both i) the second computing device and i) the second replicated data volume; and
    after acknowledgement of replication of the write to both the second computing device and the second replicated data volume, acknowledge the write to the client device; and
  wherein the third computing device is configured to:
    obtain from the first computing device the write replicated to the second replicated data volume;
    store the write at the third computing device;
    replicate the write to the fourth computing device; and
    acknowledge the write to the first computing device.

Clause 2. The system of Clause 1, wherein the client device is a virtual machine instance, and wherein first and second replicated data volumes represent a virtualized block storage device of the virtual machine instance.

Clause 3. The system of Clause 1, wherein first computing device is further configured to obtain reads of the first replicated data volume from the client device and to respond to the reads by providing data stored at the first computing device.

Clause 4. The system of Clause 1, wherein the write is stored at the first computing device within a write journal, and wherein the first computing device is further configured to persist the write to a physical storage device.

Clause 5. The system of Clause 4, wherein first computing device persists the write to a physical storage device using erasure coding.

Clause 6. A computer-implemented method to provide redundancy in a virtualized storage device replicated across at least two volumes, each volume being implemented by at least two computing devices and each volume existing in a computing network that is physically isolated from the other, the method computer-implemented comprising, at a first computing device of the at least two computing devices implementing a first volume of the at least two volumes:
  obtaining a write to the virtualized storage device from a client device;
  storing the write at the first computing device;
  replicating the write to both i) a second computing device of the at least two computing devices implementing the first volume and i) a second volume of the at least two volumes; and
  after acknowledgement of replication of the write to both the second computing device and the second volume, acknowledging the write to the client device.

Clause 7. The computer-implemented method of Clause 6, wherein the second computing device is configured to replicate the write to the second volume, and wherein replicating, by the first computing device, the write to the second volume of the at least two volumes comprises transmitting the write to the second computing device and obtaining acknowledgement from the second computing device that the write has been further transmitted and acknowledged at the second volume.

Clause 8. The computer-implemented method of Clause 6 further comprising:
  obtaining an indicating that communications between the first volume and the second volume fail to satisfy a performance metric;
  obtaining a subsequent write to the virtualized storage device from the client device; and
  acknowledging the subsequent write to the client device after acknowledgement of replication of the subsequent write to the second computing device without awaiting acknowledgement of replication of the subsequent write to the second volume.

Clause 9. The computer-implemented method of Clause 6, wherein:
  the write represents data in a first encrypted form;
  replicating the write to the second computing device comprises replicating the write to the second computing device in the first encrypted form; and
  replicating the write to the second volume comprises transmitting the write to an encryption device configured to decrypt the data in the first encrypted form, to reencrypt the data in a second encrypted form, and to transmit the data to the second volume in the second encrypted form.

Clause 10. The computer-implemented method of Clause 6 further comprising, prior to storing the write at the first computing device, verifying that the first computing device has authority as a primary computing device of the at least two computing devices implementing the first volume and that the first volume has authority as a primary volume of the at least two volumes.

Clause 11. The computer-implemented method of Clause 6 further comprising periodically transmitting to a control plane device performance metrics of the first computing device.

Clause 12. The computer-implemented method of Clause 11, wherein the performance metrics include at least one of a latency incurred to replicate the write the second computing device, a number of fails to replicate writes to the second computing device, a latency incurred to replicate the write to the second volume, a number of failures to replicate writes to the second volume, a latency required to acknowledging the write to the client device after obtaining the write, or a number of failures to acknowledging writes to the client device.

Clause 13. A system to provide redundancy in a virtualized storage device replicated across at least two volumes, each volume being implemented by at least two computing devices and each volume existing in a computing network that is physically isolated from the other, the system comprising:
  a first computing device of the at least two computing devices implementing a first volume of the at least two volumes, the first computing device configured to:
    obtain a write to the virtualized storage device from a client device;
    store the write at the first computing device;
    replicate the write to both i) a second computing device of the at least two computing devices implementing the first volume and i) a second volume of the at least two volumes; and
    after acknowledgement of replication of the write to at least one of the second computing device and the second volume, acknowledge the writes to the client device.

Clause 14. The system of Clause 13, wherein the first computing device is configured to acknowledge the writes to the client device only after acknowledgement of replication of the write to both the second computing device and the second volume.

Clause 15. The system of Clause 13, wherein the first computing device is further configured to:
  obtain a request to attach the virtualized storage device to the client device;
  request i) a verification that the first computing device is a primary computing device of the at least two computing devices implementing the first volume and ii) a verification that the first volume is a primary volume of the at least two volumes replicating the virtualized storage device; and
  accept the request after obtaining the verification that that the first computing device is the primary computing device and the verification that the first volume is the primary volume.

Clause 16. The system of Clause 15, wherein the verification that that the first computing device is the primary computing device implementing the first volume is obtained from an authority service implemented within the computing network of the first computing device, and wherein the verification that the first volume is the primary volume of the virtualized storage device is obtained from an authority service implemented across the computing network of the first computing device and the computing network of the second volume.

Clause 17. The system of Clause 13 further comprising a plurality of computing devices implementing a control plane, the plurality of computing devices being distributed among the computing network of the first volume and the computing network of the second volume and configured to:
  obtain a request to create the virtualized storage device;
  instruct the at least two computing devices of the first volume to implement the first volume;
  instruct the at least two computing devices of the second volume to implement the first volume; and instruct the first computing device of the first volume to replicate writes to the virtualized storage device to the second volume.

Clause 18. The system of Clause 17, wherein the plurality of computing devices implementing the control plane are further configured to maintain data indicating that the first volume is a primary volume for the virtualized storage device.

Clause 19. The system of Clause 17, wherein the plurality of computing devices implementing the control plane are further configured to:
  obtain, from each of the at least two computing devices implementing each of the at least two volumes, performance metric information;
  determine that communications between the first volume and the second volume do not satisfy a threshold value; and
  instruct the first computing device of the first volume to replicate data to the second volume asynchronously.

Clause 20. The system of Clause 13, wherein the write is stored at the first computing device within a write journal, and wherein the first computing device is further configured to:
  persist the write to a physical storage device;
  maintain metadata indicating a location on the physical storage device at which the write was persisted; and
  transmit the metadata to the second computing device.

Clause 21. A system for providing a data store that is replicated across at least first and second zones of a cloud provider network, wherein the first and second zones are in communication via a communication network but are electrically and physically isolated from one another, the system comprising:
  a first computing system associated with the first zone, the first computing system including at least a first computing device and a second computing device that collectively implement a first replicated data volume, wherein the first computing system further includes an authority service device configured to store a designation of the first computing device as having authority to receive writes to the first replicated data volume; and
  a second computing system associated with a second zone that is electrically and physically isolated from the first computing system, the second computing system implementing a second replicated data volume configured to replicate the writes from the first replicated data volume; and
  one or more computing devices implementing a multi-zone authority service configured to store a designation of the first computing system as having authority to receive writes to the data store;
  wherein the first computing device is configured, prior to accepting the writes to the data store from a client device and storing the writes on the first replicated data volume, to verify that i) the multi-zone authority service stores the designation of the first zone as having authority to receive writes to the data store and ii) the authority service device of the first computing system stores the designation of the first computing device as having authority to receive writes to the first replicated data volume.

Clause 22. The system of Clause 21, wherein the client device is a virtual machine instance, and wherein first and second replicated data volumes represent a virtualized block storage device of the virtual machine instance.

Clause 23. The system of Clause 21, wherein first computing device is further configured to obtain reads of the first replicated data volume from the client device and to respond to the reads by providing data stored at the first computing device after verifying that i) the multi-zone authority service stores the designation of the first computing system as having authority to receive writes to the data store and ii) the authority service device of the first computing system stores the designation of the first computing device as having authority to receive writes to the first replicated data volume.

Clause 24. The system of Clause 21, wherein the write is stored at the first computing device within a write journal, and wherein the first computing device is further configured to persist the write to a physical storage device.

Clause 25. The system of Clause 21, wherein first computing device persists the write to a physical storage device using erasure coding.

Clause 26. A computer-implemented method to provide redundancy in a virtualized storage device replicated across at least first and second zones, wherein the first and second zones are in communication via a communication network but are isolated from one another, wherein the virtualized storage device comprises a first volume in the first zone and a second volume in the second zone, each of the first and second volumes being implemented by at least two computing devices in the respective first and zones, the computer-implemented method comprising, at a first computing device of the at least two computing devices implementing the first volume:
  obtaining a request to write data to the virtualized storage device;
  prior to accepting the request:
    verifying that an authority service within the first zone stores a designation of the first computing device as having authority to receive writes to the first volume;
    verifying that an authority service distributed among the first and second zone stores information usable to identify the first volume as having authority to receive writes to the virtualized storage device; and accepting the request at least partly by:
    storing the write at the first computing device;
    replicating the write to both i) a second computing device of the at least two computing devices implementing the first volume and ii) the second volume; and
    acknowledging the request.

Clause 27. The computer-implemented method of Clause 26, wherein verifying that the authority service within the first zone stores the designation of the first computing device as having authority to receive writes to the first volume comprises verifying that the first computing device holds a valid lease from the authority service within the first zone designating the first computing device as having authority to receive writes to the first volume.

Clause 28. The computer-implemented method of Clause 27 further comprising periodically renewing the lease with the authority service within the first zone.

Clause 29. The computer-implemented method of Clause 26, wherein the authority service is further distributed among a third zone isolated from the first and second zones, and wherein the method further comprises, at the authority service:
   obtaining from the first computing device a request for a lease designating the first computing device as having authority to receive writes to the first volume;
   determining that a majority of devices implementing the authority service among the first, second, and third zones designate the first computing device as having authority to receive writes to the first volume; and
   returning to the first computing device the lease.

Clause 30. The computer-implemented method of Clause 29, wherein determining that the majority of devices implementing the authority service among the first, second, and third zones designate the first computing system as having authority to receive writes to the first volume comprises implementing a consensus protocol among the devices implementing the authority service.

Clause 31. The computer-implemented method of Clause 26, wherein acknowledging the request occurs only after replicating the write to both i) the second computing device and ii) the second volume.

Clause 32. The computer-implemented method of Clause 26, wherein acknowledging the request occurs after obtaining acknowledgement of the write from the second computing device and without awaiting acknowledgement of the write from the second volume.

Clause 33. A system to provide redundancy in a virtualized storage device replicated across at least a first and second zone, wherein the virtualized storage device comprises a first volume in the first zone and a second volume in the second zone, each of the first and second volumes being implemented by at least two computing devices in the respective first and second zones, the system comprising:
   a first computing device of the at least two computing devices implementing the first volume, the first computing device configured to:
     obtain a request to write data to the virtualized storage device;
     verify that an authority service within the first zone stores a designation of the first computing system as having authority to receive writes to the first volume;
     verify that an authority service distributed among the first and second zones stores information usable to identify the first volume as having authority to receive writes to the virtualized storage device; and
     subsequent to verification that the authority service within the first zone stores he designation of the first computing system as having authority to receive writes to the first volume and that the authority service distributed among the first and second zone stores the designation of the first volume as having authority to receive writes to the virtualized storage device, writing the data to the virtualized storage device.

Clause 34. The system of Clause 33, wherein to verify that the authority distributed among the first and second zones stores the designation of the first volume as having authority to receive writes to the virtualized storage device, the first computing device is configured to validate a lease from the authority service distributed among the first and second zone designating the first computing system as having authority to receive writes to the first volume.

Clause 35. The system of Clause 34, wherein the first computing device is further configured to periodically renew the lease with the authority service distributed among the first and second zones.

Clause 36. The system of Clause 33 further comprising the authority service distributed among the first and second zones, wherein the authority service distributed among the first and second zones comprises a plurality of computing devices configured to:
   obtain a request for designation of the first volume as having authority to receive writes to the virtualized storage device;
   implement a consensus protocol to determine that the first volume has authority to receive writes to the virtualized storage device; and
   return a lease designating the first volume as having authority to receive writes to the virtualized storage device.

Clause 37. The system of Clause 36, wherein the lease is associated with a duration during which the lease is valid.

Clause 38. The system of Clause 33, wherein the first computing device is further configured to:
   obtain a second request to write data to the virtualized storage device;
   determine that the authority service within the first zone does not store the designation of the first computing system as having authority to receive writes to the first volume; and
   decline the second request.

Clause 39. The system of Clause 33, wherein the information usable to identify the first volume as having authority to receive writes to the virtualized storage device is a designation of the first zone as containing a primary volume of the virtualized storage device.

Clause 40. The system of Clause 33 wherein the first computing device is further configured to periodically transmit to a control plane device performance metrics of the first computing device.

Clause 41. A system to provide redundancy in a virtualized storage device replicated across at least a first and second zone of a plurality of zones, wherein the plurality of zones are in communication via a communication network but are electrically and physically isolated from one another, and wherein the virtualized storage device comprises a first volume in the first zone and a second volume in the second zone, the system comprising:
   a first computing system associated with the first zone, the first computing system including at least a first computing device and a second computing device that collectively implement the first volume, wherein data written to the first volume is encrypted using a first encryption key;
   a second computing system associated with the second zone, the second computing system including at least a first computing device and a second computing device that collectively implement the second volume, wherein data written to the second volume is encrypted using a second encryption key; and
   one or more computing devices implementing an encryption service configured to:

obtain data written to the first volume encrypted using a first encryption key and submitted from the first volume for replication to the second volume;

using the first encryption key, decrypt the data to result in decrypted data;

using the second encryption key, encrypt the decrypted data to result in reencrypted data;

transmit the reencrypted data to the second volume;

obtain an acknowledgement from the second volume of receipt of the reencrypted data; and subsequent to the acknowledgement from the second volume of receipt of the reencrypted data, acknowledge to the first volume receipt of the data at the encryption service;

wherein the first volume is configured to acknowledge to a client device the data written to the first volume only after receiving acknowledgement of receipt of the data at the encryption service.

Clause 42. The system of Clause 41, wherein the virtualized storage device represents a block storage device of a virtual machine instance.

Clause 43. The system of Clause 41, wherein the one or more computing devices implementing the encryption service are configured to store the decrypted data only in transient memory.

Clause 44. The system of Clause 41, wherein the first and second encryption keys are provided to the first and second volumes by a key management service, and wherein the one or more computing devices implementing the encryption service are configured to obtain the first and second encrypted keys from the key management service after authenticating with the key management service.

Clause 45. The system of Clause 41, wherein the one or more computing devices implementing the encryption service are configured to be inaccessible to client devices.

Clause 46. The system of Clause 41, wherein the one or more computing devices implementing the encryption service and the second volume utilize intercompatible application programming interfaces, and wherein the one or more computing devices implementing the encryption service obtain the data written to the first volume by presenting to the first volume as a secondary volume.

Clause 47. A computer-implemented method to provide redundancy in a virtualized storage device replicated across at least a first and second zone of a plurality of zones, wherein the plurality of zones are in communication via a communication network but are isolated from one another, and wherein the virtualized storage device comprises a first volume in the first zone and storing data encrypted according to a first encryption key and a second volume in the second zone and storing data encrypted according to a second encryption key, the computer-implemented method comprising:

obtaining from a client device a write of data to the first volume and encrypted using a first encryption key;

prior to acknowledging the write to the client device:

using the first encryption key, decrypting the data to result in decrypted data;

using the second encryption key, encrypting the decrypted data to result in reencrypted data;

transmitting the reencrypted data to the second volume; and obtaining an acknowledgement from the second volume of receipt of the reencrypted data; and subsequent to the acknowledgement from the second volume of receipt of the reencrypted data, acknowledging write to the client device.

Clause 48. The computer-implemented method of Clause 47, wherein the first volume is designated by as a primary volume for the virtualized storage device, the primary volume having authority to accept writes to the virtualized storage device and responsibility for replicating writes to the second volume.

Clause 49. The computer-implemented method of Clause 47 further comprising assigning to the write of data a write sequence number and transmitting the write sequence number to the second volume.

Clause 50. The computer-implemented method of Clause 47 further comprising storing the decrypted data only in transient memory.

Clause 51. The computer-implemented method of Clause 47, wherein obtaining an acknowledgement from the second volume of receipt of the reencrypted data comprises obtaining an acknowledgement that at least two devices implementing the second volume have replicated the reencrypted data.

Clause 52. The computer-implemented method of Clause 47 further comprising storing the data to the first volume prior to acknowledging write to the client device.

Clause 53. The computer-implemented method of Clause 47, wherein storing the data to the first volume comprises generating a log entry within a write journal, and wherein the method further comprises persisting the data to a data store.

Clause 54. The computer-implemented method of Clause 53, wherein persisting the data to the data store comprises storing the data at the data store in an erasure coded form.

Clause 55. A system to provide redundancy in a virtualized storage device replicated across at least a first and second zone of a plurality of zones, wherein the plurality of zones are in communication via a communication network but are isolated from one another, and wherein the virtualized storage device comprises a first volume in the first zone and associated with a first encryption key and a second volume in the second zone and associated with a second encryption key, the system comprising:

a data store including computer-executable instructions; and one or more processors configured to execute the computer-executable instructions to:

obtain data written by a client device to the first volume and encrypted using the first encryption key;

using the first encryption key, decrypt the data to result in decrypted data;

using the second encryption key, encrypt the decrypted data to result in reencrypted data;

transmit the reencrypted data to the second volume for storage; and cause acknowledgement of the write to the client device.

Clause 56. The system of Clause 55, wherein the one or more processors are configured to cause acknowledgement of the write to the client device only after receiving acknowledgement from the second volume of receipt of the reencrypted data.

Clause 57. The system of Clause 55, wherein the one or more processors are configured to cause acknowledgement of the write to the client device prior to receiving acknowledgement from the second volume of receipt of the reencrypted data.

Clause 58. The system of Clause 55, wherein the one or more processors are configured to cause acknowledgement of the write to the client device by acknowledging the write to the first volume, and wherein the first volume acknowledges the write to the client device.

Clause 59. The system of Clause 55, wherein data written to the first volume is encrypted using the first encryption key.

Clause 60. The system of Clause 55, wherein the first encryption key is a negotiated key based on communication between the first volume and the one or more processors.

Clause 61. The system of Clause 55, wherein the one or more processors are configured to obtain data written by the client device to the first volume from the first volume via a first secure communication channel, and wherein the one or more processors are configured to transmit the renencrypted data to the second volume via a second communication channel.

Clause 62. The system of Clause 61, wherein the first and second communication channel are Transport Layer Security (TLS) compliant.

Clause 63. A system to provide redundancy in a virtualized storage device replicated across at least a first and second zone of a plurality of zones, wherein the plurality of zones are in communication via a communication network but are electrically and physically isolated from one another, and wherein the virtualized storage device comprises a first volume in the first zone and a second volume in the second zone, the system comprising:
- a first computing system associated with the first zone, the first computing system including at least a first computing device and a second computing device that collectively implement the first volume;
- a second computing system associated with the second zone, the second computing system including at least a first computing device and a second computing device that collectively implement the second volume; and
- one or more computing devices implementing a multi-zone control plane service configured to:
  - detect a failure of the second volume;
  - select a zone from the plurality of zones in which to create a new volume for the for the virtualized storage device;
  - generate the new volume within the selected zone, wherein the new volume is implemented by at least two computing devices within the selected zone;
  - instruct the first volume to maintain a record of data in the first volume at a point in time; and
  - instruct the new volume to populate data within the new volume from the record of data in the first volume at the point in time;
- wherein the at least two computing devices implementing the new volume are configured to replicate writes received at the first volume subsequent to the point in time, and to populate the new volume with data from the record of data in in the first volume at the point in time without overwriting replicated writes received subsequent to the point in time.

Clause 64. The system of Clause 63, wherein the virtualized storage device represents a block storage device of a virtual machine instance.

Clause 65. The system of Clause 63, wherein the first volume is designated by the multi-zone control plane service as a primary volume for the virtualized storage device, the primary volume having authority to accept writes to the virtualized storage device.

Clause 66. The system of Clause 63, wherein the first computing device implementing the first volume is designated as a primary computing device for the first volume having authority to accept writes to the first volume, and wherein the first computing device is configured to:
- subsequent to the point in time and prior to completion of population of the new volume with data from the record:
  - obtain a request to write data to the first virtualized storage device;
  - store within the first volume; and
  - replicate the data to one or more secondary volumes of the virtualized storage device.

Clause 67. The system of Clause 66, wherein the one or more computing devices implementing the multi-zone control plane service are further configured to notify the first computing device implementing the first volume that the new volume is a secondary volume of the virtualized storage device.

Clause 68. A computer-implemented method to provide redundancy in a virtualized storage device replicated across at least a first and second zone of a plurality of zones, wherein the plurality of zones are in communication via a communication network but are isolated from one another, and wherein the virtualized storage device comprises a first volume in the first zone and a second volume in the second zone, the computer-implemented method comprising:
- detecting a failure of the second volume of the virtualized storage device;
- selecting a zone from the plurality of zones in which to create a new volume for the for the virtualized storage device;
- generating the new volume within the selected zone, wherein the new volume is implemented by at least two computing devices within the selected zone;
- causing the first volume to maintain a record of data in the first volume at a point in time; and
- causing the new volume to:
  - replicate writes to the virtualized storage device obtained at the first volume subsequent to the point in time; and
  - populate data within the new volume from the record of data in the first volume at the point in time without overwriting replicas of the writes obtained at the first volume subsequent to the point in time.

Clause 69. The method of Clause 68, wherein selecting the zone from the plurality of zones in which to create the new volume for the for the virtualized storage device comprises:
- detecting that the second zone has not failed; and
- assigning the second zone as the selected zone.

Clause 70. The method of Clause 68, wherein selecting the zone from the plurality of zones in which to create the new volume for the for the virtualized storage device comprises:

detecting that the second zone has failed; and
selecting the zone in which to create the new volume from among a set comprising the plurality of zones but excluding the first zone and the second zone.

Clause 71. The method of Clause 68, wherein writes to the virtualized storage device are assigned sequential write numbers, and wherein causing the new volume to populate data within the new volume from the record of data in the first volume at the point in time without overwriting replicas of the writes obtained at the first volume subsequent to the point in time comprises causing the new volume to decline to overwrite data within the new volume associated with a write number higher than a write number associated with data from the record of data in the first volume at the point in time.

Clause 72. The method of Clause 68, wherein causing the first volume to maintain a record of data in the first volume at a point in time comprises causing the first volume to handle writes to the virtualized storage device obtained at the first volume subsequent to the point in time using a copy-on-write operation.

Clause 73. The method of Clause 68, wherein the writes to the virtualized storage device obtained at the first volume are encrypted using a first encryption key associated with the first volume, and wherein causing the new volume to replicate the writes comprises:
transmitting the writes from the first volume to an encryption device; and
at the encryption device:
  decrypting the writes using the first encryption key;
  reencrypting the writes using a second encryption key associated with the new volume; and
  transmitting the writes encrypting using the second encryption key associated with the new volume from the encryption device to the new volume.

Clause 74. A system to provide redundancy in a virtualized storage device replicated across at least a first and second zone of a plurality of zones, wherein the plurality of zones are in communication via a communication network but are isolated from one another, and wherein the virtualized storage device comprises a first volume in the first zone and a second volume in the second zone, the system comprising:
a data store including computer-executable instructions; and
one or more processors configured to execute the computer-executable instructions to:
  select a zone from the plurality of zones in which to create a new volume for the for the virtualized storage device;
  generate the new volume within the selected zone, wherein the new volume is implemented by at least two computing devices within the selected zone;
  cause the first volume to maintain a record of data in the first volume at a point in time; and
  cause the new volume to:
    replicate writes to the virtualized storage device obtained at the first volume subsequent to the point in time; and
    populate data within the new volume from the record of data in the first volume at the point in time without overwriting replicas of the writes obtained at the first volume subsequent to the point in time.

Clause 75. The system of Clause 74 further comprising a first computing device implementing the first volume, and wherein the first computing device is configured to store writes to the first volume within a write journal, and wherein the first computing device is further configured to persist the writes from the write journal to a physical storage device.

Clause 76. The system of Clause 75, wherein first computing device is configured to persist the writes to a physical storage device using erasure coding.

Clause 77. The system of Clause 76, wherein the physical storage device is further accessible to a second computing device implementing the first volume, and wherein the first computing device is further configured to:
obtain metadata indicating locations on the physical storage device to which writes to the virtualized storage device have been persisted; and
replicate the metadata to the second computing device.

Clause 78. The system of Clause 75, wherein the first computing device is further configured to accept writes to the virtualized storage device only after verifying that the first volume is a primary volume for the virtualized storage device and that the first computing device is a primary computing device for the first volume.

Clause 79. The system of Clause 74, wherein the processor is configured to execute the computer-executable instructions responsive to a failure of the second volume.

Clause 80. The system of Clause 80, wherein the failure of the second volume corresponds to a failure of the second volume to acknowledge writes to the virtualized storage device within a threshold period of time.

Clause 81. The system of Clause 74, wherein the processor is configured to execute the computer-executable instructions responsive to detecting that the virtualized storage device is replicated to less than a threshold number of volumes.

Clause 82. The system of Clause 74, wherein the computer-executable instructions further cause the processor to:
obtain a request to designate the new volume as a primary volume for the virtualized storage device having authority to accept writes to the virtualized storage device;
modify an authority record for the virtualized storage device to indicate the new volume is the primary volume; and
cause the new volume to replicate, to the first volume, writes to the virtualized storage device obtained at the new volume.

Clause 83. A system for managing replication lag within a virtualized block storage device that is replicated across at least first and second zones of a cloud provider network, wherein the first and second zones are in communication via a communication network but are electrically and physically isolated from one another, the system comprising:
a first computing system associated with the first zone, the first computing system including one or more computing devices implementing a first replicated data volume of the virtualized block storage device, wherein the first replicated data volume is configured to obtain writes to the virtualized block storage device, individual writes being of a defined byte size and associated with sequence numbers indicating an ordering of the writes; and a second computing system associated with a second zone that is electrically and physically isolated from the first computing system, the second computing system including one or more computing devices implementing a second replicated data volume of the virtualized block storage device, the second replicated data volume configured to replicate the writes from the first replicated data volume; and one or more computing devices configured to:
obtain, from the one or more computing devices implementing the first replicated data volume, a first sequence number identifying a last write to be persisted to the first replicated data volume at a point in time;
obtain, from the one or more computing devices implementing the second replicated data volume, a second sequence number identifying a last write to be persisted to the second replicated data volume at the point in time;
determine a difference in first and second sequence numbers;
calculate an expected maximum data loss size during failure of the first replicated data volume at least partly by multiplying the difference in first and second sequence numbers by the defined byte size; and
transmit the expected maximum data loss size during failure of the first replicated data volume to a client device associated with the virtualized block storage device.

Clause 84. The system of Clause 83, wherein writes to the virtualized block storage device are represented as log entries within a write journal.

Clause 85. The system of Clause 83, wherein each of the first and second replicated data volumes is implemented by at least two computing devices in the respective first and second zones, the at least two computing devices including a primary device configured to obtain writes at the respective first or second replicated data volume and a secondary device configured to replicate the writes obtained at the primary device.

Clause 86. The system of Clause 83, wherein the one or more computing devices are further configured to determine that the expected maximum data loss size during failure of the first replicated data volume exceeds a threshold value, and wherein transmission of the expected maximum data loss size is responsive to determining that the expected maximum data loss size exceeds a threshold value.

Clause 87. A computer-implemented method for managing replication lag within a virtualized block storage device that is replicated across at least first and second zones of a cloud provider network, wherein the first and second zones are in communication via a communication network but are isolated from one another, the method comprising:
obtaining, from one or more computing devices implementing a first replicated data volume of the virtualized block storage device, a first sequence number identifying a last write to be persisted to the first replicated data volume at a point in time, wherein the first replicated data volume is configured to obtain writes to the virtualized block storage device, individual writes being of a defined byte size and associated with sequence numbers indicating an ordering of the writes;
obtaining, from the one or more computing devices implementing a second replicated data volume of the virtualized block storage device, the second replicated data volume being configured to replicate the writes from the first replicated data volume, a second sequence number identifying a last write to be persisted to the second replicated data volume at the point in time;
calculating a replication lag metric reflecting replication lag between the first and second replication data volumes at least partly by multiplying difference in first and second sequence numbers by the defined byte size; and
transmitting the replication lag metric to metric data store device associated with the virtualized block storage device.

Clause 88. The computer-implemented method of Clause 87, wherein the metric data store device is a client device.

Clause 89. The computer-implemented method of Clause 87, wherein the replication lag metric represents an expected maximum data loss size during failure of the first replicated data volume.

Clause 90. The computer-implemented method of Clause 87, wherein the writes to the virtualized block storage device are encrypted.

Clause 91. The computer-implemented method of Clause 87, wherein the a defined byte size is a product of a number of blocks written to within individual writes and a block size on the virtualized block storage device.

Clause 92. The computer-implemented method of Clause 87 further comprising:
obtaining, from one or more computing devices implementing the first replicated data volume, a first time reflecting when a write identified by a third sequence number was persisted to the first replicated data volume;
obtaining, from the one or more computing devices implementing the second replicated data volume, a second time reflecting when a write identified by the third sequence number was persisted to the second replicated data volume;
calculating a second replication lag metric reflecting a difference between the first and second times, the second replication lag metric representing a time required to replicate writes between the first and second replicated data volumes; and
transmitting the second replication lag metric to the metric data store device.

Clause 93. The computer-implemented method of Clause 87 further comprising:
generating a statistical value associate with the replication lag metric and at least one previous calculation of the replication lag metric; and
transmitting the statistical value to the metric data store device.

Clause 94. The computer-implemented method of Clause 87 further comprising repeatedly recalculating the replication lag metric during a set of additional points in time and, for each recalculated value, transmitting the recalculated value to the metric data store device.

Clause 95. The computer-implemented method of Clause 87, wherein the method is implemented by a computing system comprising devices distributed between the first and second zones.

Clause 96. Non-transitory computer-readable media comprising computer-executable instructions implementable on a computing system associated with a virtualized block storage device that is replicated across at least first and second zones of a cloud provider network, the first and second zones in communication via a communication network but isolated from one another, wherein the instructions, when executed by the computing system, cause the computing system to:
  obtain, from one or more computing devices implementing a first replicated data volume of the virtualized block storage device, a first sequence number identifying a last write to be persisted to the first replicated data volume at a point in time, wherein the first replicated data volume is configured to obtain writes to the virtualized block storage device, individual writes being of a defined byte size and associated with sequence numbers indicating an ordering of the writes;
  obtain, from the one or more computing devices implementing a second replicated data volume of the virtualized block storage device, the second replicated data volume being configured to replicate the writes from the first replicated data volume, a second sequence number identifying a last write to be persisted to the second replicated data volume at the point in time;
  calculate a replication lag metric reflecting replication lag between the first and second replication data volumes at least partly based on a difference in first and second sequence numbers and the defined byte size; and
  transmit the replication lag metric to a metric output location associated with the virtualized block storage device.

Clause 97. The non-transitory computer-readable media of Clause 96, wherein the computing system comprises a set of computing devices distributed among the first and second zones.

Clause 98. The non-transitory computer-readable media of Clause 96, wherein the instructions further cause the computing system to:
  obtain, from one or more computing devices implementing the first replicated data volume, a first time reflecting when a write identified by a third sequence number was persisted to the first replicated data volume;
  obtain, from the one or more computing devices implementing the second replicated data volume, a second time reflecting when a write identified by the third sequence number was persisted to the second replicated data volume;
  calculate a second replication lag metric reflecting a difference between the first and second times, the second replication lag metric representing a time required to replicate writes between the first and second replicated data volumes; and
  transmit the second replication lag metric to the metric output location.

Clause 99. The non-transitory computer-readable media of Clause 96, wherein the instructions further cause the computing system to:
  generate a statistical value associate with the replication lag metric and at least one previous calculation of the replication lag metric; and
  transmit the statistical value to the metric data store device.

Clause 100. The non-transitory computer-readable media of Clause 96, wherein the instructions further cause the computing system to determine that the replication lag metric exceeds a threshold value, and wherein transmission of the replication lag metric is responsive to determining that the replication lag metric exceeds a threshold value.

Clause 101. The non-transitory computer-readable media of Clause 96, wherein the instructions further cause the computing system to repeatedly recalculate the replication lag metric during a set of additional points in time and transmit each recalculated value to the metric data store device.

Clause 102. The non-transitory computer-readable media of Clause 96, wherein recalculation of the replication lag metric occurs at a first periodicity and transmission of each recalculated value occurs at a second periodicity.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. All changes which come within the meaning and range of equivalency of the Clauses are to be embraced within their scope.

What is claimed is:

1. A system to provide redundancy in a virtualized storage device replicated across at least a first and second zone of a plurality of zones, wherein the plurality of zones are in communication via a communication network but are electrically and physically isolated from one another at least partly by being geographically distanced from one another within a geographic region and having independent electrical power, and wherein the virtualized storage device comprises a first volume in the first zone and a second volume in the second zone, each of the first and second volumes configured to provide a distinct copy of data of the virtualized storage device, the system comprising:

a first computing system associated with the first zone, the first computing system including at least a first computing device and a second computing device that are collectively configured to implement the first volume to provide a first copy of the data of the virtualized storage device by providing redundant endpoints for reading from and writing to the first volume;

a second computing system associated with the second zone, the second computing system including at least a first computing device and a second computing device that are collectively configured to implement the second volume to provide a second copy of the data of the virtualized storage device by providing redundant endpoints for reading from and writing to the second volume; and one or more computing devices implementing a multi-zone control plane service configured to:
- detect a failure of the second volume;
- select a zone from the plurality of zones in which to create a new volume for the virtualized storage device;
- generate the new volume within the selected zone, wherein the new volume is implemented by at least two computing devices within the selected zone, and wherein the new volume provides a third copy of the data of the virtualized storage device;
- instruct the first volume to maintain a record of data in the first volume at a point in time; and
- instruct the new volume to populate the new volume with the data in the first volume at the point in time using the record of data in the first volume at the point in time;

wherein the at least two computing devices implementing the new volume are configured to replicate writes received at the first volume subsequent to the point in time, and to populate the new volume with the data in the first volume at the point in time using the record of data in the first volume at the point in time without overwriting replicated writes received subsequent to the point in time at least partly by copying, from the first volume to the new volume, data in the record that corresponds to locations of the first volume that have not been written to subsequent to the point in time and declining to copy, from the first volume to the new volume, data in the record that corresponds to locations of the first volume that have been written to subsequent to the point in time.

2. The system of claim 1, wherein the virtualized storage device represents a block storage device of a virtual machine instance.

3. The system of claim 1, wherein the first volume is designated by the multi-zone control plane service as a primary volume for the virtualized storage device, the primary volume having authority to accept writes to the virtualized storage device.

4. The system of claim 1, wherein the first computing device implementing the first volume is designated as a primary computing device for the first volume having authority to accept writes to the first volume, and wherein the first computing device is configured to:
- subsequent to the point in time and prior to completion of population of the new volume with data from the record:
  - obtain a request to write data to the virtualized storage device;
  - store within the first volume; and
  - replicate the data to one or more secondary volumes of the virtualized storage device.

5. The system of claim 4, wherein the one or more computing devices implementing the multi-zone control plane service are further configured to notify the first computing device implementing the first volume that the new volume is a secondary volume of the virtualized storage device.

6. A computer-implemented method to provide redundancy in a virtualized storage device replicated across at least a first and second zone of a plurality of zones, wherein the plurality of zones are in communication via a communication network but are isolated from one another, and wherein the virtualized storage device comprises a first volume in the first zone and a second volume in the second zone, the first volume configured to provide a first copy of data of the virtualized storage device and the second volume configured to provide a second copy of the data of the virtualized storage device, the computer-implemented method comprising:
- detecting a failure of the second volume of the virtualized storage device;
- selecting a zone from the plurality of zones in which to create a new volume for the virtualized storage device;
- generating the new volume within the selected zone, wherein the new volume is implemented by at least two computing devices within the selected zone, and wherein the new volume provides a third copy of the data of the virtualized storage device;
- causing the first volume to maintain a record of data in the first volume at a point in time; and
- causing the new volume to:
  - replicate writes to the virtualized storage device obtained at the first volume subsequent to the point in time; and
- populate the new volume with the data in the first volume at the point in time using the record of data in the first volume at the point in time without overwriting replicated writes received subsequent to the point in time at least partly by copying, from the first volume to the new volume, data in the record that corresponds to locations of the first volume that have not been written to subsequent to the point in time without copying, from the first volume to the new volume, data in the record that corresponds to locations of the first volume that have been written to subsequent to the point in time.

7. The method of claim 6, wherein selecting the zone from the plurality of zones in which to create the new volume for the virtualized storage device comprises:
- detecting that the second zone has not failed; and
- assigning the second zone as the selected zone.

8. The method of claim 6, wherein selecting the zone from the plurality of zones in which to create the new volume for the virtualized storage device comprises:
- detecting that the second zone has failed; and
- selecting the zone in which to create the new volume from among a set comprising the plurality of zones but excluding the first zone and the second zone.

9. The method of claim 6, wherein writes to the virtualized storage device are assigned sequential write numbers, and wherein causing the new volume to populate data within the new volume from the record of data in the first volume at the point in time without overwriting replicas of the writes obtained at the first volume subsequent to the point in time at least partly by copying, from the first volume to the new volume, data in the record that corresponds to locations of the first volume that have not been written to subsequent to the point in time without copying, from the first volume to the new volume, data in the record that corresponds to locations of the first volume that have been written to subsequent to the point in time comprises causing the new volume to decline to overwrite data within the new volume associated with a write number higher than a write number associated with data from the record of data in the first volume at the point in time.

10. The method of claim 6, wherein causing the first volume to maintain a record of data in the first volume at a point in time comprises causing the first volume to handle writes to the virtualized storage device obtained at the first volume subsequent to the point in time using a copy-on-write operation.

11. The method of claim 6, wherein the writes to the virtualized storage device obtained at the first volume are encrypted using a first encryption key associated with the first volume, and wherein causing the new volume to replicate the writes comprises:
- transmitting the writes from the first volume to an encryption device; and
- at the encryption device:
  - decrypting the writes using the first encryption key;
  - reencrypting the writes using a second encryption key associated with the new volume; and
  - transmitting the writes encrypting using the second encryption key associated with the new volume from the encryption device to the new volume.

12. A system to provide redundancy in a virtualized storage device replicated across at least a first and second zone of a plurality of zones, wherein the plurality of zones are in communication via a communication network but are isolated from one another, and wherein the virtualized storage device comprises a first volume in the first zone and a second volume in the second zone, the first volume configured to provide a first copy of data of the virtualized storage device and the second volume configured to provide a second copy of the data of the virtualized storage device, the system comprising:
- a data store including computer-executable instructions; and
- one or more processors configured to execute the computer-executable instructions to:
  - select a zone from the plurality of zones in which to create a new volume for the virtualized storage device;
  - generate the new volume within the selected zone, wherein the new volume is implemented by at least two computing devices within the selected zone, and wherein the new volume provides a third copy of the data of the virtualized storage device;
  - cause the first volume to maintain a record of data in the first volume at a point in time; and
  - cause the new volume to:
    - replicate writes to the virtualized storage device obtained at the first volume subsequent to the point in time; and
    - populate the new volume with the data in the first volume at the point in time using the record of data in the first volume at the point in time without overwriting replicas of the writes obtained at the first volume subsequent to the point in time at least partly by copying, from the first volume to the new volume, data in the record that corresponds to locations of the first volume that have not been written to subsequent to the point in time without copying, from the first volume to the new volume, data in the record that corresponds to locations of the first volume that have been written to subsequent to the point in time.

13. The system of claim 12 further comprising a first computing device implementing the first volume, and wherein the first computing device is configured to store writes to the first volume within a write journal, and wherein the first computing device is further configured to persist the writes from the write journal to a physical storage device.

14. The system of claim 13, wherein first computing device is configured to persist the writes to a physical storage device using erasure coding.

15. The system of claim 14, wherein the physical storage device is further accessible to a second computing device implementing the first volume, and wherein the first computing device is further configured to:
- obtain metadata indicating locations on the physical storage device to which writes to the virtualized storage device have been persisted; and
- replicate the metadata to the second computing device.

16. The system of claim 13, wherein the first computing device is further configured to accept writes to the virtualized storage device only after verifying that the first volume is a primary volume for the virtualized storage device and that the first computing device is a primary computing device for the first volume.

17. The system of claim 12, wherein the processor is configured to execute the computer-executable instructions responsive to a failure of the second volume.

18. The system of claim 17, wherein the failure of the second volume corresponds to a failure of the second volume to acknowledge writes to the virtualized storage device within a threshold period of time.

19. The system of claim 12, wherein the processor is configured to execute the computer-executable instructions responsive to detecting that the virtualized storage device is replicated to less than a threshold number of volumes.

20. The system of claim 12, wherein the computer-executable instructions further cause the processor to:
- obtain a request to designate the new volume as a primary volume for the virtualized storage device having authority to accept writes to the virtualized storage device;
- modify an authority record for the virtualized storage device to indicate the new volume is the primary volume; and
- cause the new volume to replicate, to the first volume, writes to the virtualized storage device obtained at the new volume.

* * * * *